(12) United States Patent
Brewster, Jr.

(10) Patent No.: US 6,600,502 B1
(45) Date of Patent: Jul. 29, 2003

(54) IMMERSIVE INTERFACE INTERACTIVE MULTIMEDIA SOFTWARE METHOD AND APPARATUS FOR NETWORKED COMPUTERS

(75) Inventor: Donald C. Brewster, Jr., Fairfax Station, VA (US)

(73) Assignee: Innovative Technology Application, Inc., Springfield, VA (US)

( * ) Notice: Subject to any disclaimer, the term of this patent is extended or adjusted under 35 U.S.C. 154(b) by 0 days.

(21) Appl. No.: 09/550,016

(22) Filed: Apr. 14, 2000

(51) Int. Cl.[7] .................................................. G06F 3/14
(52) U.S. Cl. ...................................... 345/854; 345/840
(58) Field of Search ................................ 345/854, 835, 345/705, 708, 765, 700, 716, 145, 840

(56) References Cited

U.S. PATENT DOCUMENTS

| | | |
|---|---|---|
| 5,347,628 A | 9/1994 | Brewer et al. |
| 5,721,851 A | 2/1998 | Cline et al. |
| 5,737,553 A | 4/1998 | Bartok |
| 5,808,614 A | 9/1998 | Nagahara et al. |
| 5,838,326 A | 11/1998 | Card et al. |
| 5,874,966 A | 2/1999 | Polimeni et al. |
| 5,896,133 A | 4/1999 | Lynch et al. |
| 5,926,179 A | 7/1999 | Matsuda et al. |
| 5,945,989 A * | 8/1999 | Freishtat et al. ............ 345/733 |
| 5,957,697 A | 9/1999 | Iggulden et al. |
| 5,969,720 A | 10/1999 | Lisle et al. |
| 5,983,244 A | 11/1999 | Nation |
| 5,991,781 A | 11/1999 | Nielsen |
| 6,002,401 A | 12/1999 | Baker |
| 6,018,345 A * | 1/2000 | Berstis ......................... 345/854 |
| 6,377,928 B1 * | 4/2002 | Saxena et al. ............... 704/275 |

* cited by examiner

*Primary Examiner*—Cao (Kevin) Nguyen
(74) *Attorney, Agent, or Firm*—Foley & Lardner

(57) ABSTRACT

A method and computer software immersive interface for networked computers that utilize a pointing device (mouse, trackball, touchscreen, tablet, etc) and are connected by networks which allows intuitive and rapid navigation and access to programs, data, and any digital media such as images, pictures, photographs, audio, video, and models through a robust-feedback, highly interactive multimedia interface that is designed to appear and sound like a pseudo-physical virtual or real-life scene which is self-explaining and easily recognizable to the user. Interaction Elements within this scene take advantage of a pre-existing connotation to the user so that the functionality of each element can be quickly and easily recognized and manipulated. These Interaction Elements within the scene have multiple states, depending upon user input, and provide three types of robust multimedia functionality feedback to the user in response to every pertinent user activity. The robust feedback includes at least two of visual imagery feedback, visual textual feedback, and audio feedback.

50 Claims, 38 Drawing Sheets

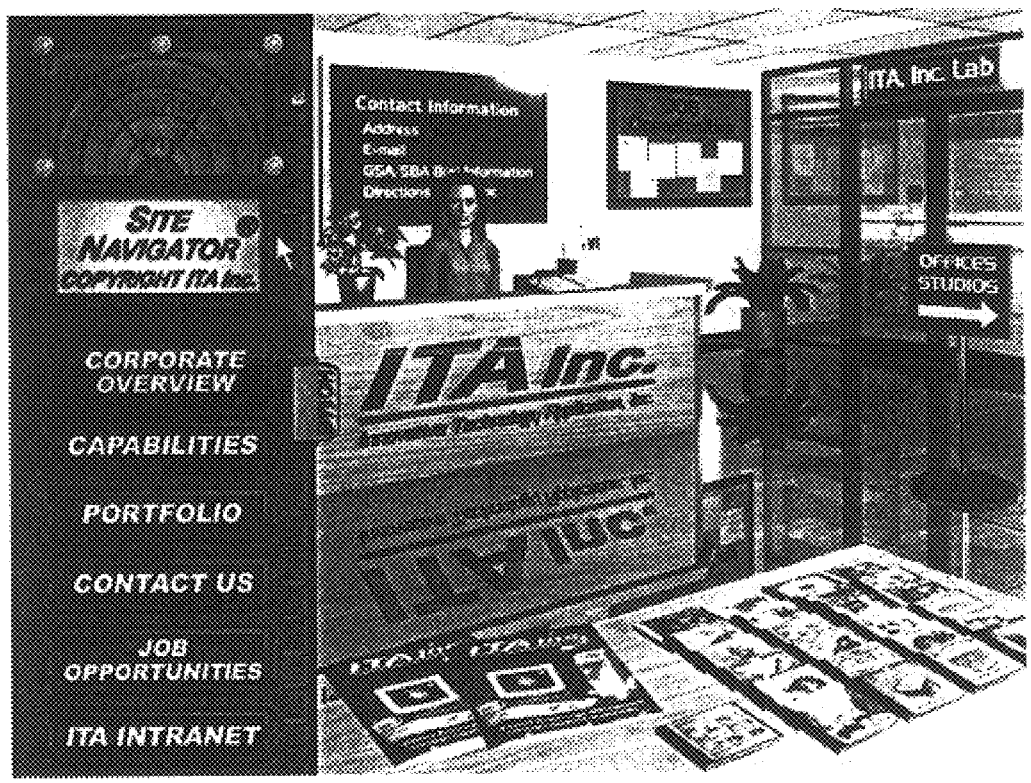

FIG. 1A "INITIAL SCREEN"

Welcome to Innovative Technology Application, Incorporated! It is our pleasure to serve you. This Home page will assist you in getting an Overview of the corporation, learn about our Capabilities, show you some of our work in our Portfolio, and provide you with other information on how to Contact Us and our Job Opportunities.

Both the Site Navigator and the objects on screen can help you utilize this site. Please roll the pointer over any item onscreen and you will receive an explanation of that item's purpose. Clicking on an object will activate it -- Clicking on Home in any screen returns you here. Thank you for visiting -- please come again soon!

FIG. 1B "ORIENTATION BRIEF AUDIO TRANSCRIPT"

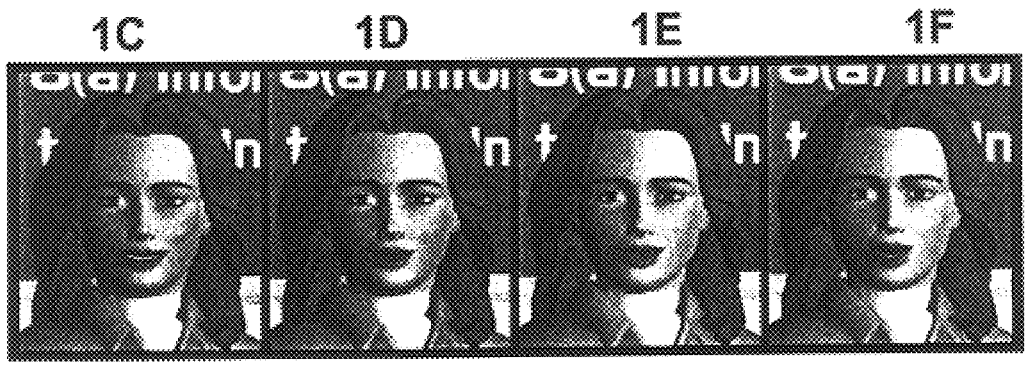

FIG. 1C-F "RECEPTIONIST ANIMATION"

FIG. 2 "FRAME OF REFERENCE"
Frame of Reference

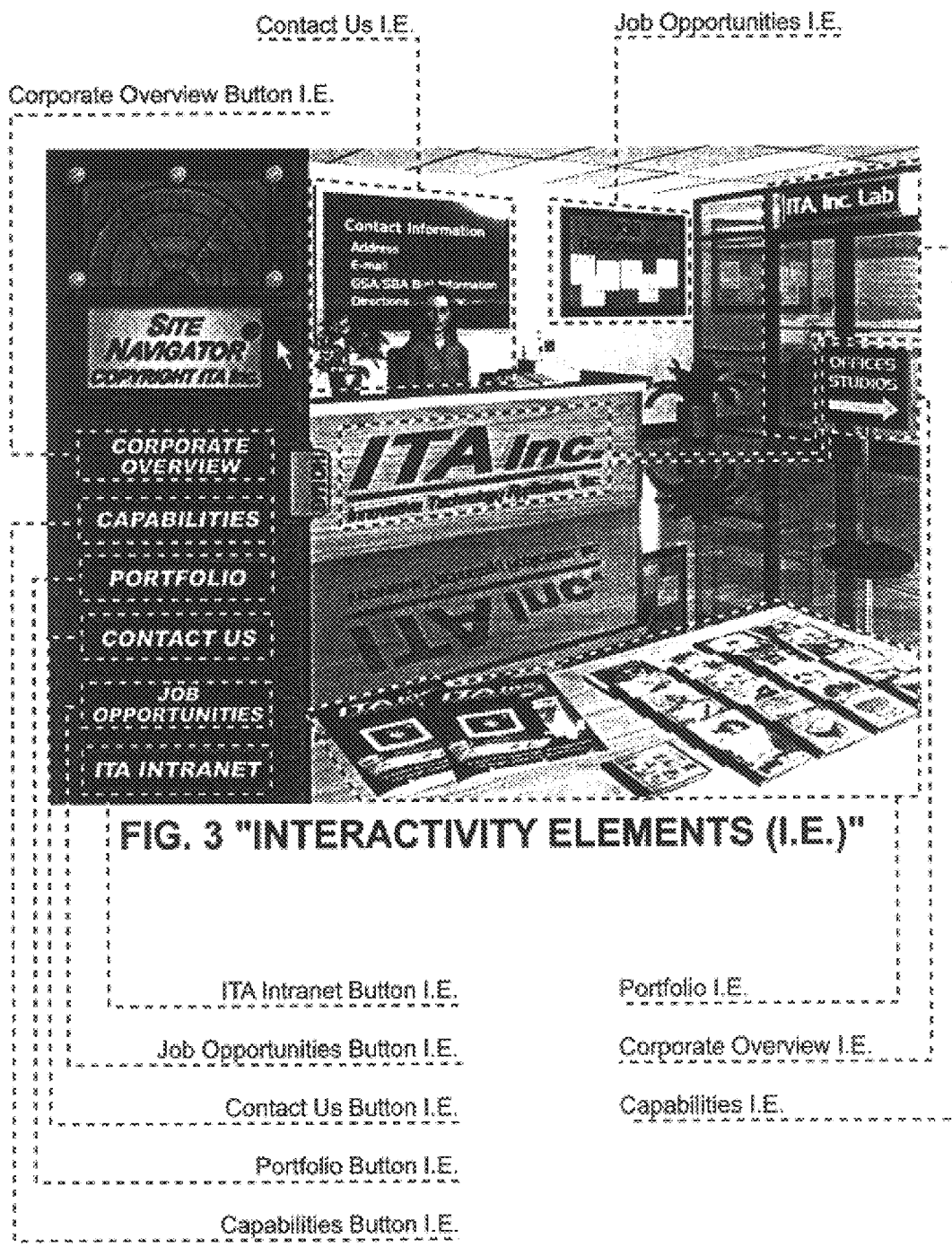

FIG. 4 "CONTACT US I.E."

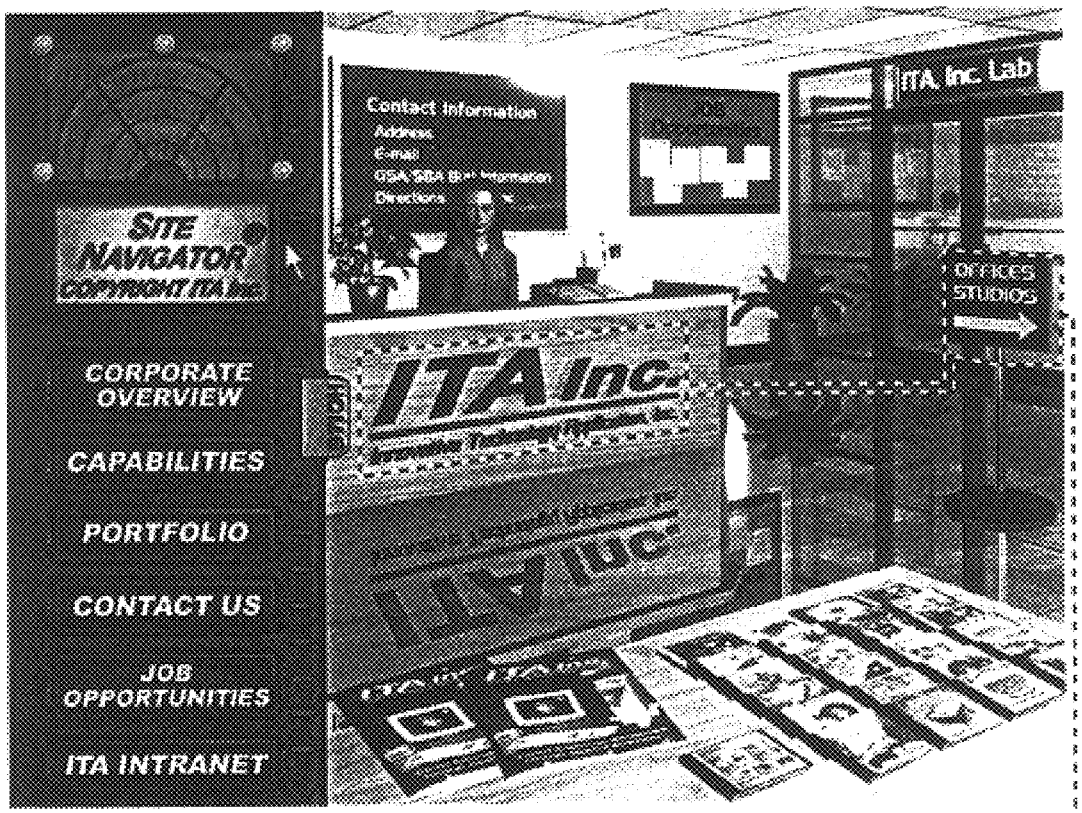
FIG. 5 "CORPORATE OVERVIEW I.E."

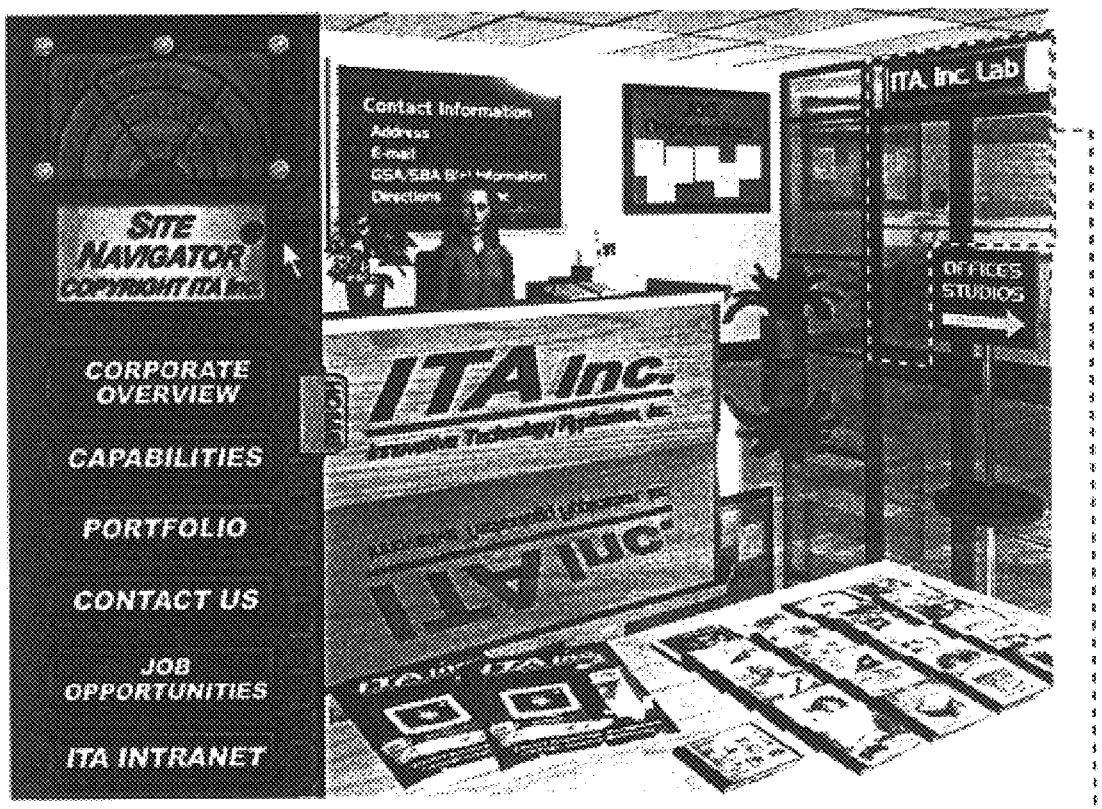
FIG. 6 "CAPABILITIES I.E."

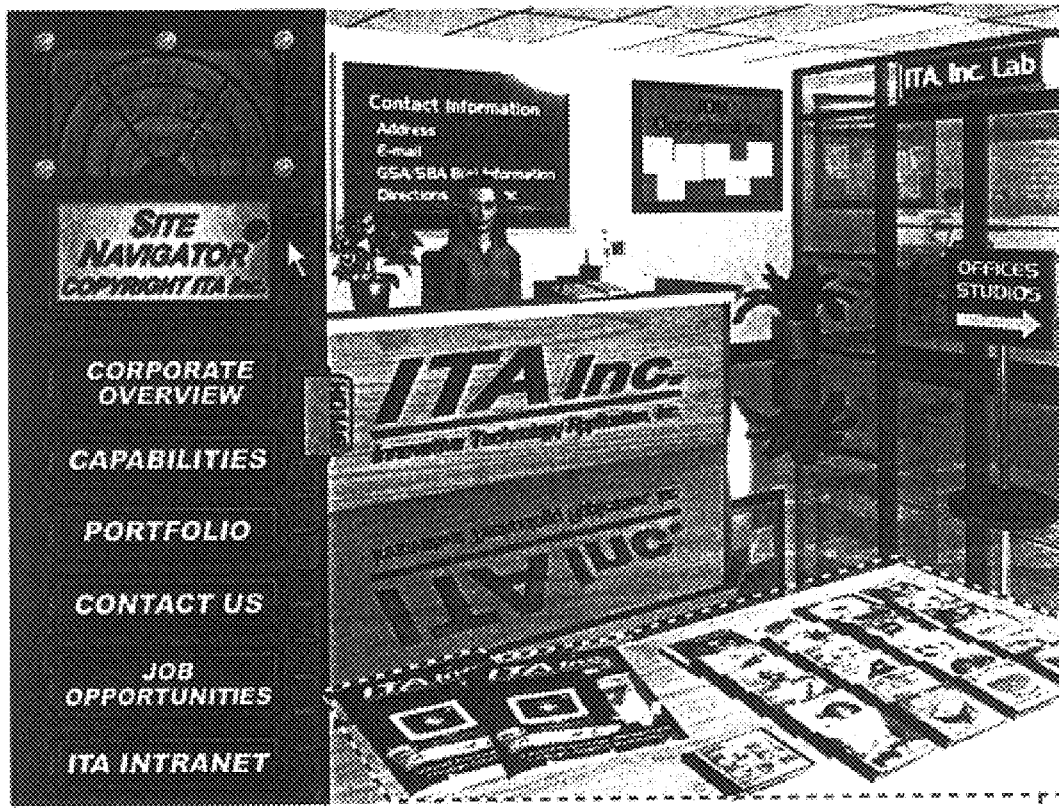
FIG. 7 "PORTFOLIO I.E."

FIG. 8 "JOB OPPORTUNITIES I.E."

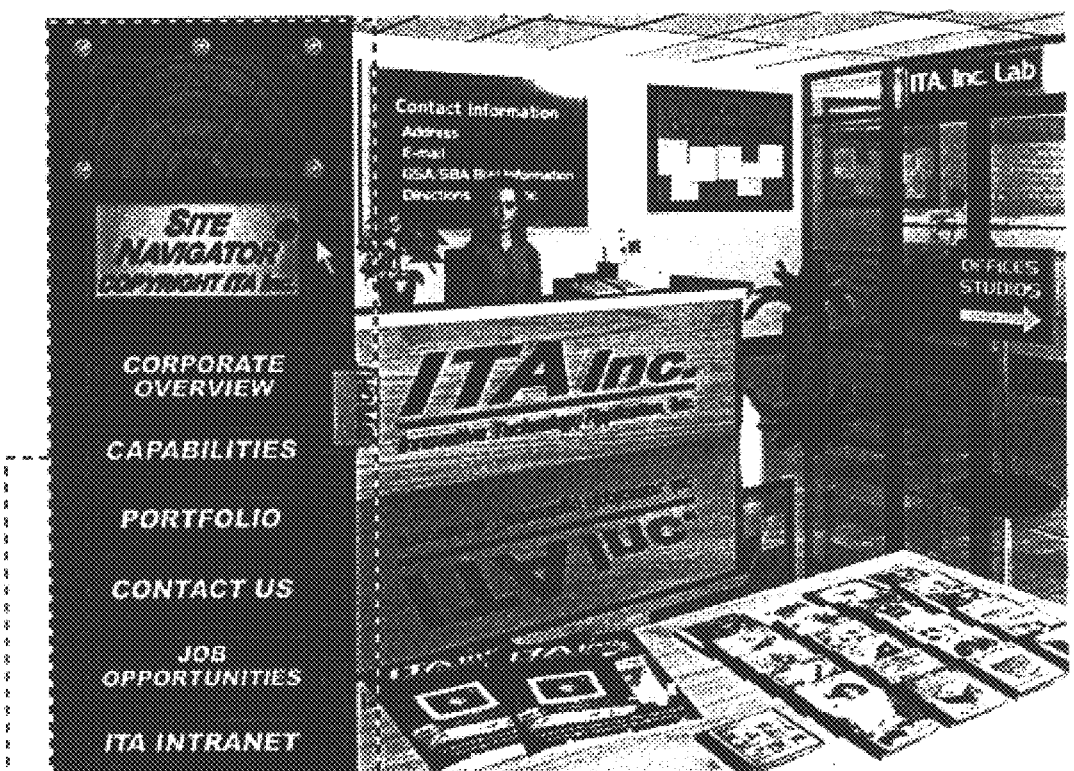
FIG. 9 "SITE NAVIGATOR"

FIG. 10 "BUTTON I.E.s"

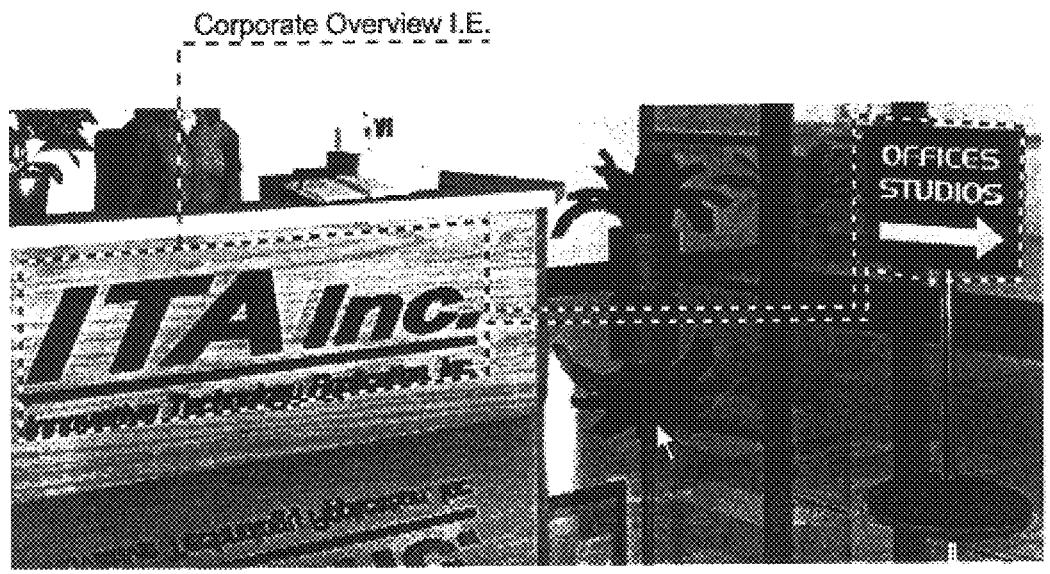
FIG. 11A "INACTIVE STATE OF CORPORATE OVERVIEW I.E."
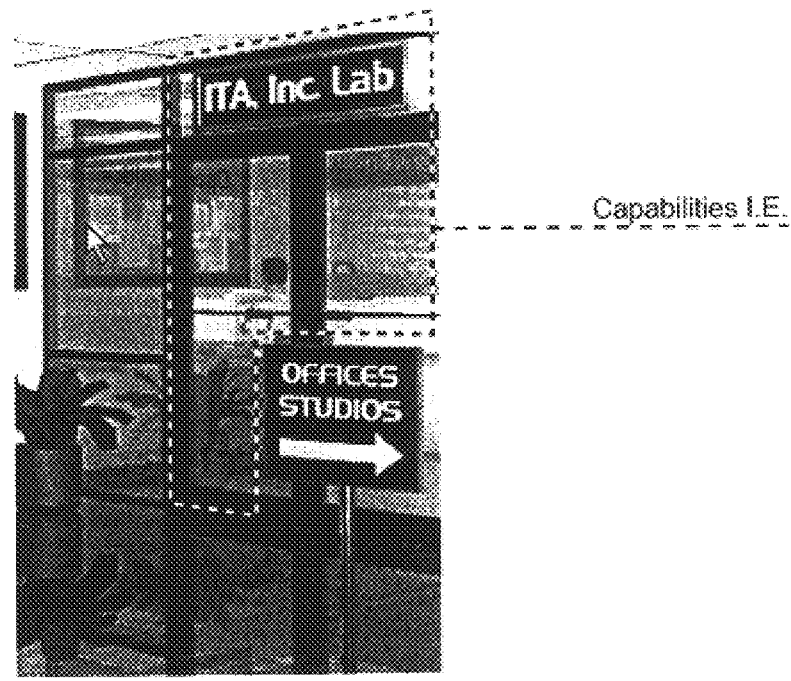
FIG. 11B "INACTIVE STATE OF CAPABILITIES I.E."

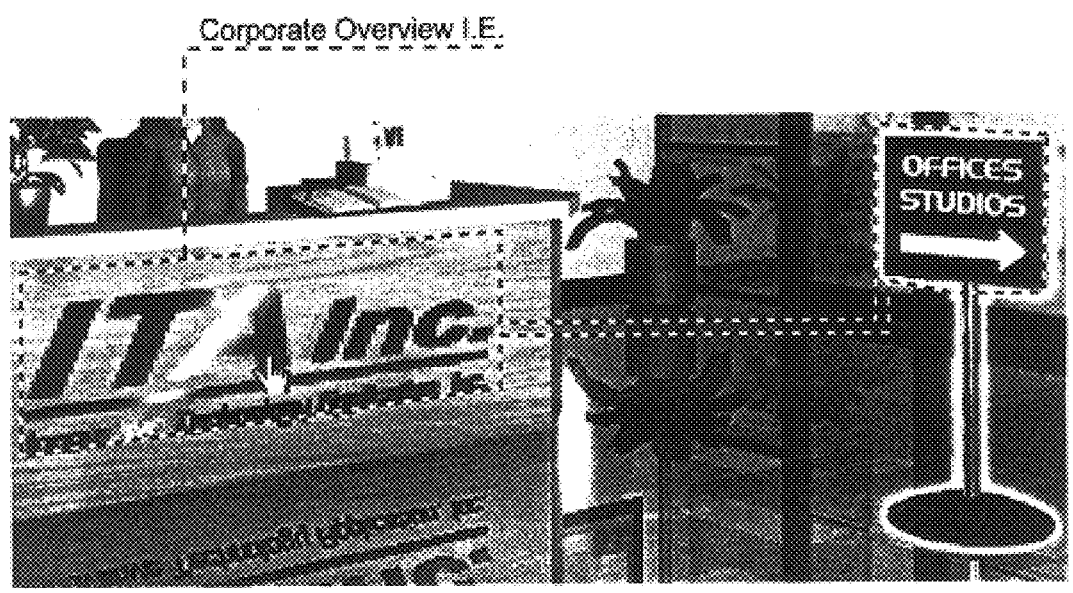
FIG. 12 "CORPORATE OVERVIEW I.E. ACTIVE BY ROLLOVER STATE"

FIG. 13 "CORPORATE OVERVIEW I.E. ACTIVE BY ROLLOVER STATE LOGO ANIMATION"

Click here to learn more about ITA, Incorporated; to review our mission, values, and vision; to get an overview of our team; or to learn about where we're located.

FIG. 14 "CORPORATE OVERVIEW I.E. ACTIVE BY ROLLOVER STATE AUDIO TRANSCRIPT"

FIG. 15 "CORPORATE OVERVIEW I.E. ACTIVE BY ROLLOVER STATE"

FIG. 16 "CORPORATE OVERVIEW I.E. ACTIVE BY ROLLOVER STATE RECEPTIONIST ANIMATION"

FIG. 18 "CAPABILITIES I.E. ACTIVE BY ROLLOVER STATE"

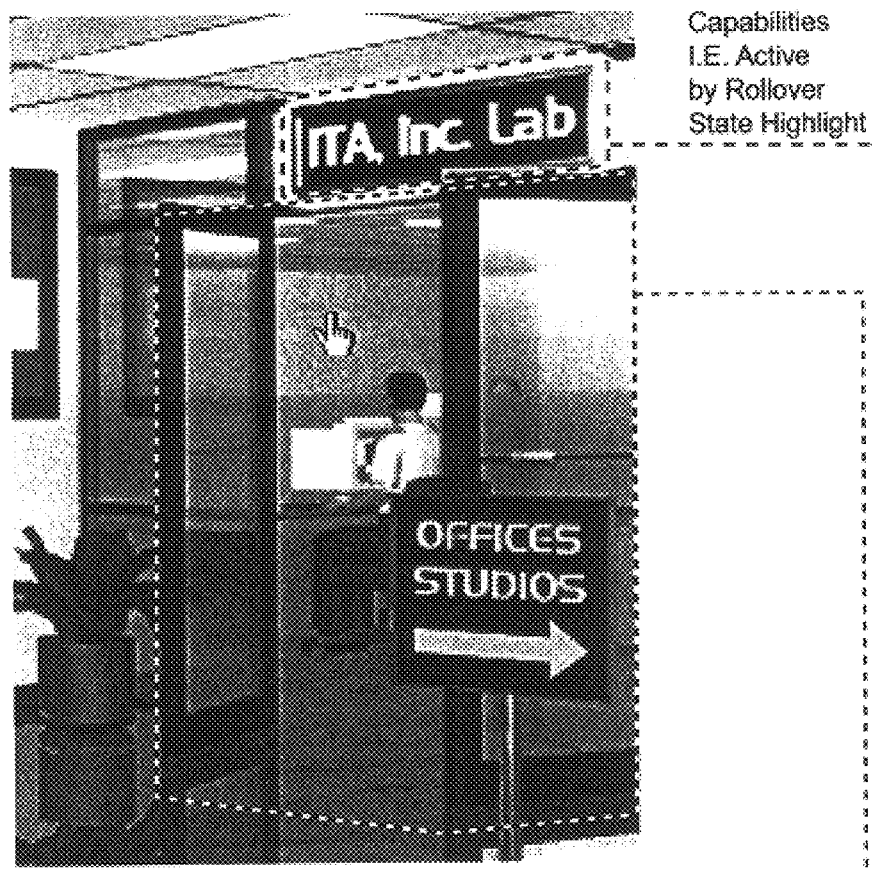
FIG. 19 "CAPABILITIES I.E. ACTIVE BY ROLLOVER STATE IMAGE AND HIGHLIGHT"

Click here to overview our capabilities; to view our product lines; to learn about our people's skill sets; to review our hardware; or to learn about our software tools.

FIG. 20 "CAPABILITIES I.E. ACTIVE BY ROLLOVER STATE AUDIO TRANSCRIPT"

FIG. 21 "CAPABILITIES I.E. ACTIVE BY ROLLOVER STATE RECEPTIONIST ANIMATION"

FIG. 22 "CAPABILITIES BUTTON I.E. ACTIVE BY ANOTHER I.E. HIGHLIGHT AND SCREEN TEXT CHANGES"

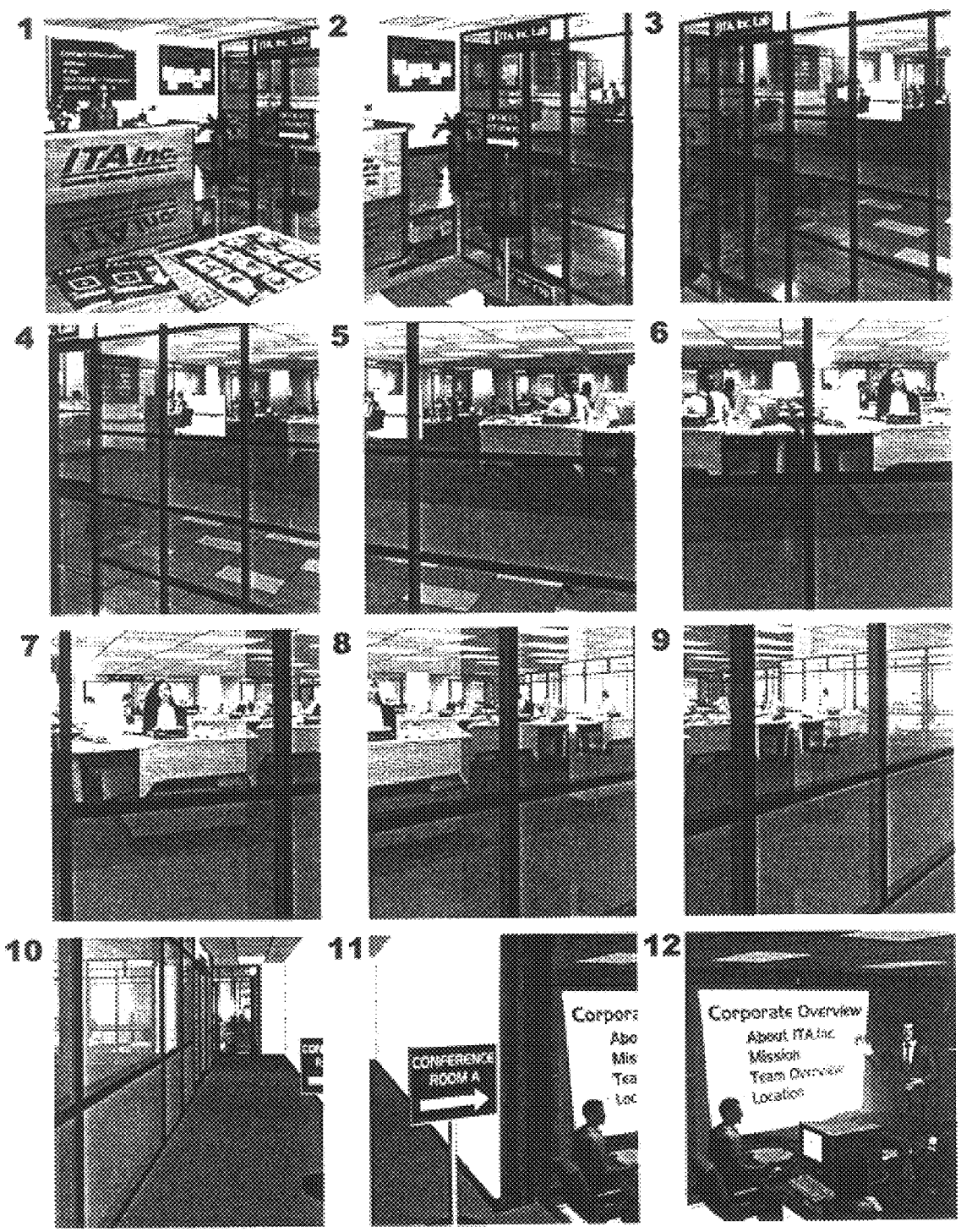
FIG. 23A "CORPORATE OVERVIEW TRANSITION ANIMATION RESULTING FROM CORPORATE OVERVIEW I.E. ACTIVE BY SINGLE LEFT CLICK STATE"

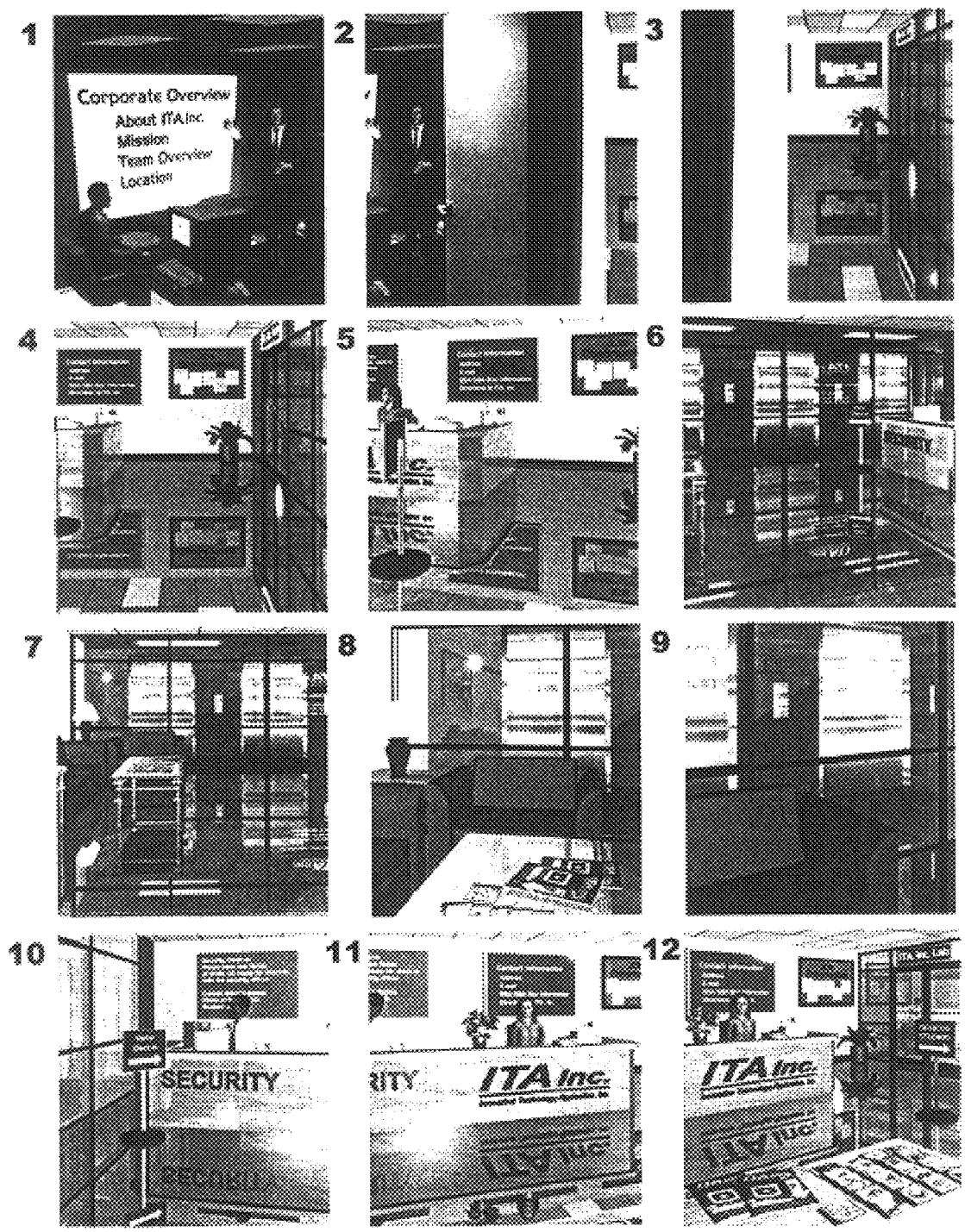
FIG. 23B "CORPORATE OVERVIEW TRANSITION ANIMATION RESULTING FROM HOME BUTTON I.E. ACTIVE BY SINGLE LEFT CLICK STATE"

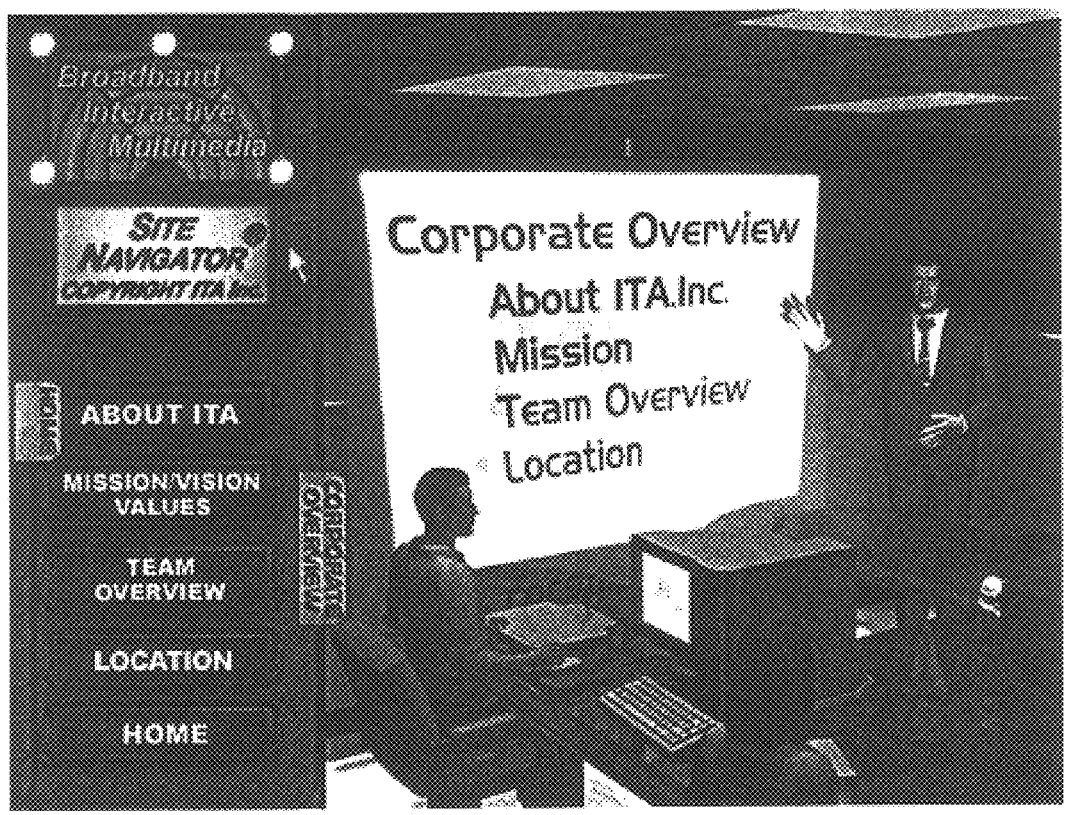
FIG. 24 "CORPORATE OVERVIEW SUBMENU"

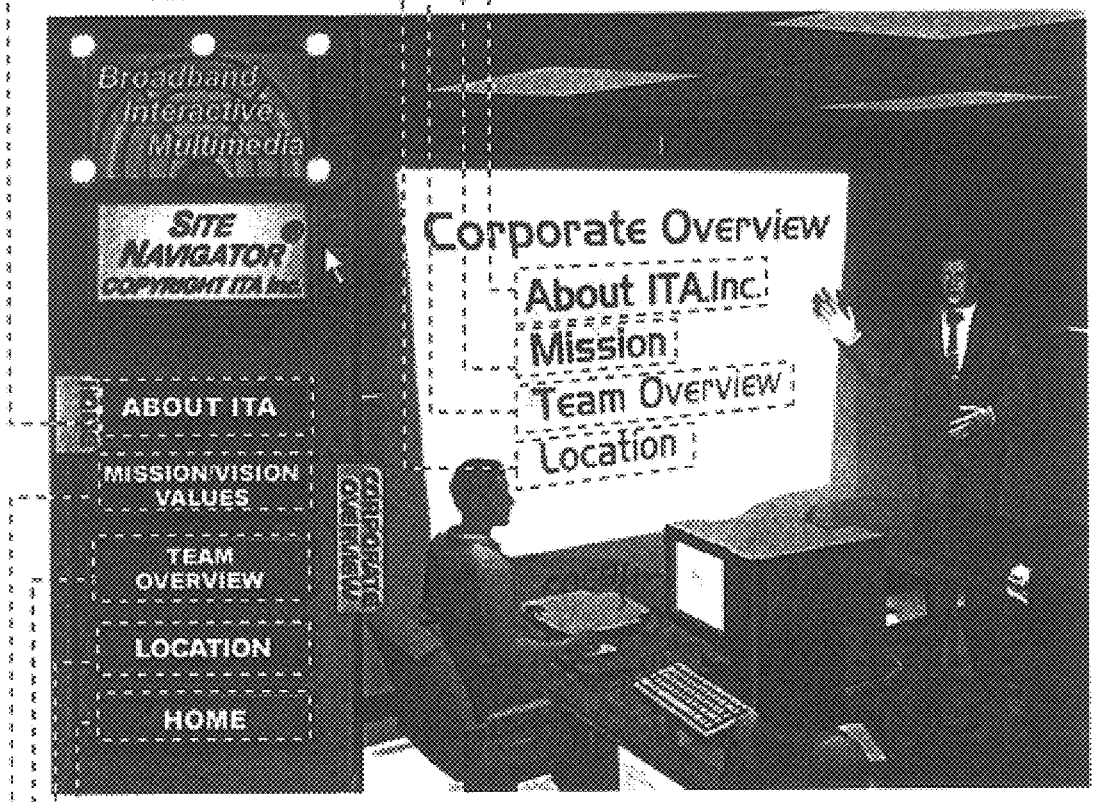
FIG. 25 "CORPORATE OVERVIEW SUBMENU INTERACTIVITY ELEMENTS (I.E.)"

You've selected to receive our Corporate Overview briefing. Here you can learn about ITA, Incorporated and its history, review our mission and vision, meet many of the our team members, and find out where we work. Please roll the pointer over any item to learn its purpose -- click to make a selection. Click the Home button to return to the previous menu.

FIG. 26 "CORPORATE OVERVIEW SUBMENU ORIENTATION BRIEF AUDIO TRANSCRIPT"

FIG. 27 "CAPABILITIES SUBMENU"

You've selected to learn more about our Capabilities. Here you can receive a general overview of ITA, Incorporated capabilities, learn about our product lines, review the skills of our personnel, and understand the software and hardware tools that we utilize. Please roll the pointer over any item to learn its purpose -- click to make a selection. Click the Home button to return to the previous menu.

FIG. 29 "CAPABILITIES SUBMENU ORIENTATION BRIEF AUDIO TRANSCRIPT"

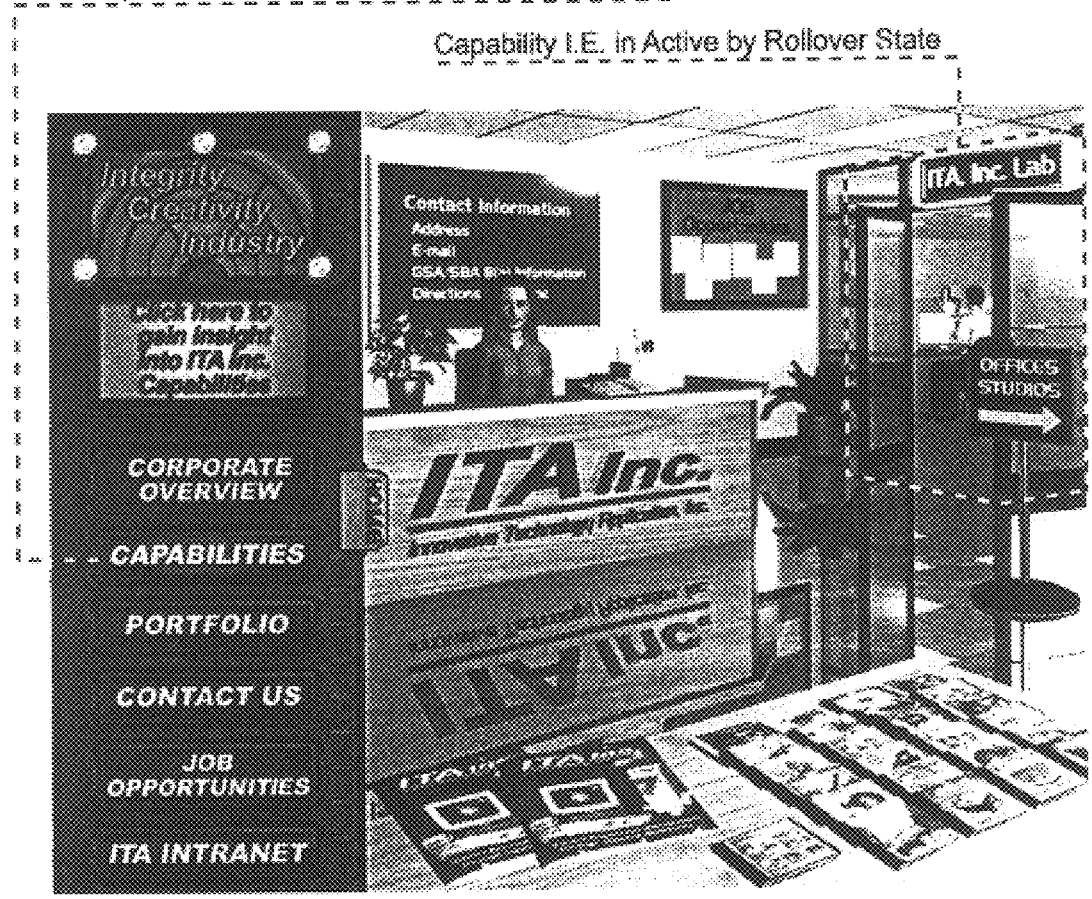
FIG. 30 "CAPABILITIES I.E. IN ACTIVE BY ROLLOVER STATE CAUSES CAPABILITY BUTTON I.E. TO ACTIVE BY ANOTHER I.E. STATE"

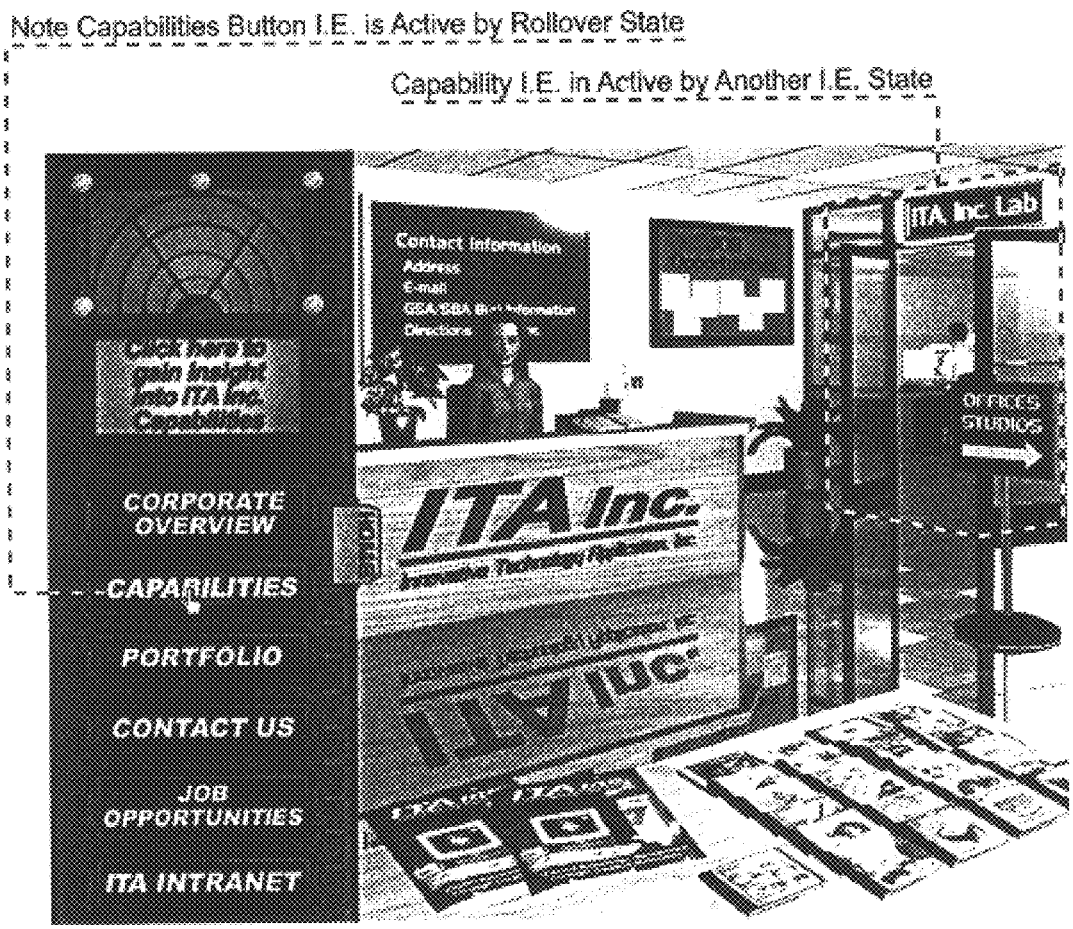
FIG. 31 "CAPABILITIES BUTTON I.E. IN ACTIVE BY ROLLOVER STATE CAUSES CAPABILITY I.E. TO ACTIVE BY ANOTHER I.E. STATE"

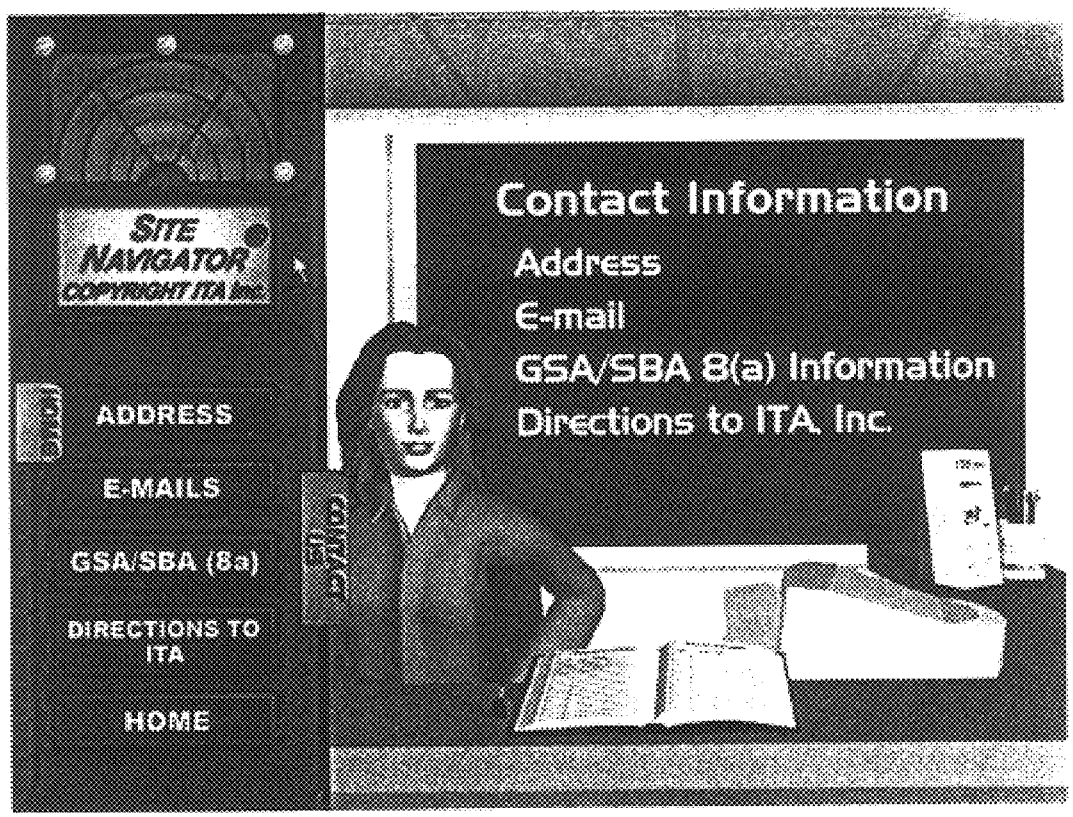
FIG. 32 "CONTACT US CLOSEUP SUBMENU EXAMPLE"

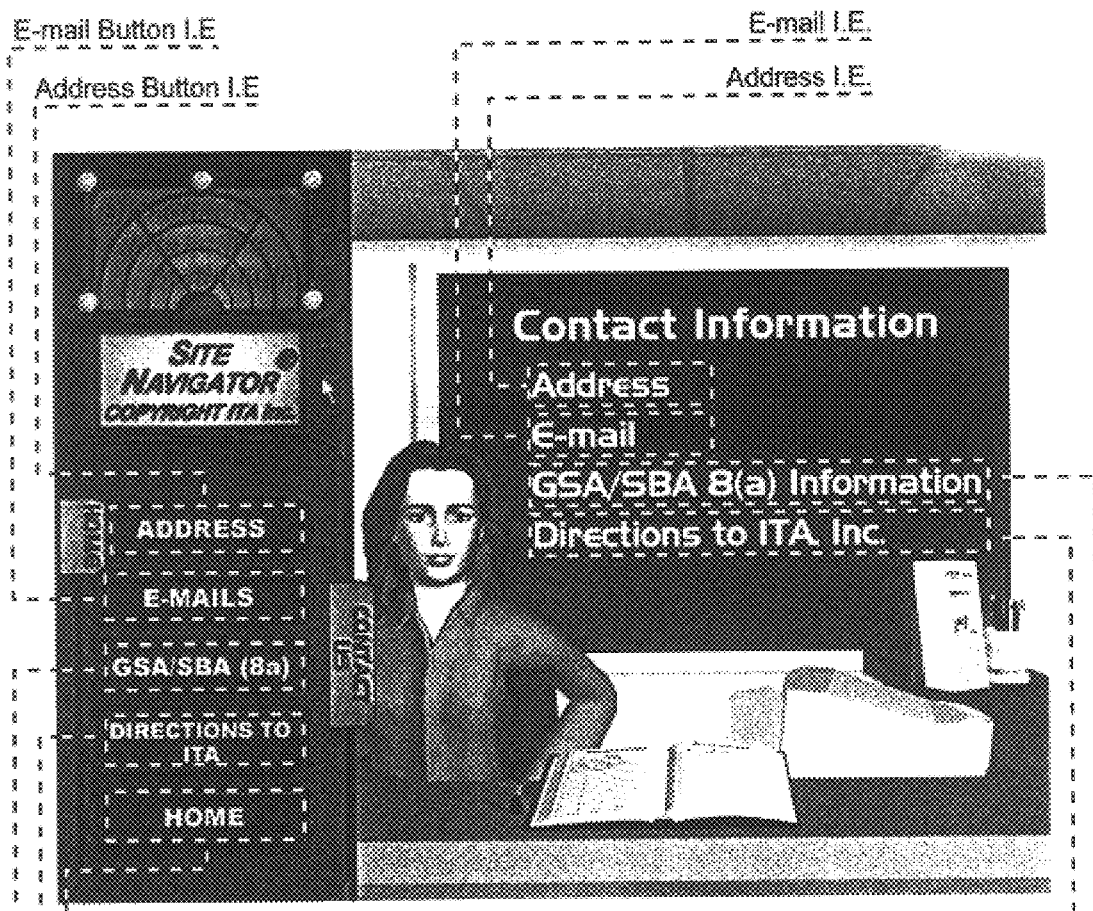
FIG. 33 "CONTACT US CLOSEUP SUBMENU EXAMPLE NEW I.E.s"

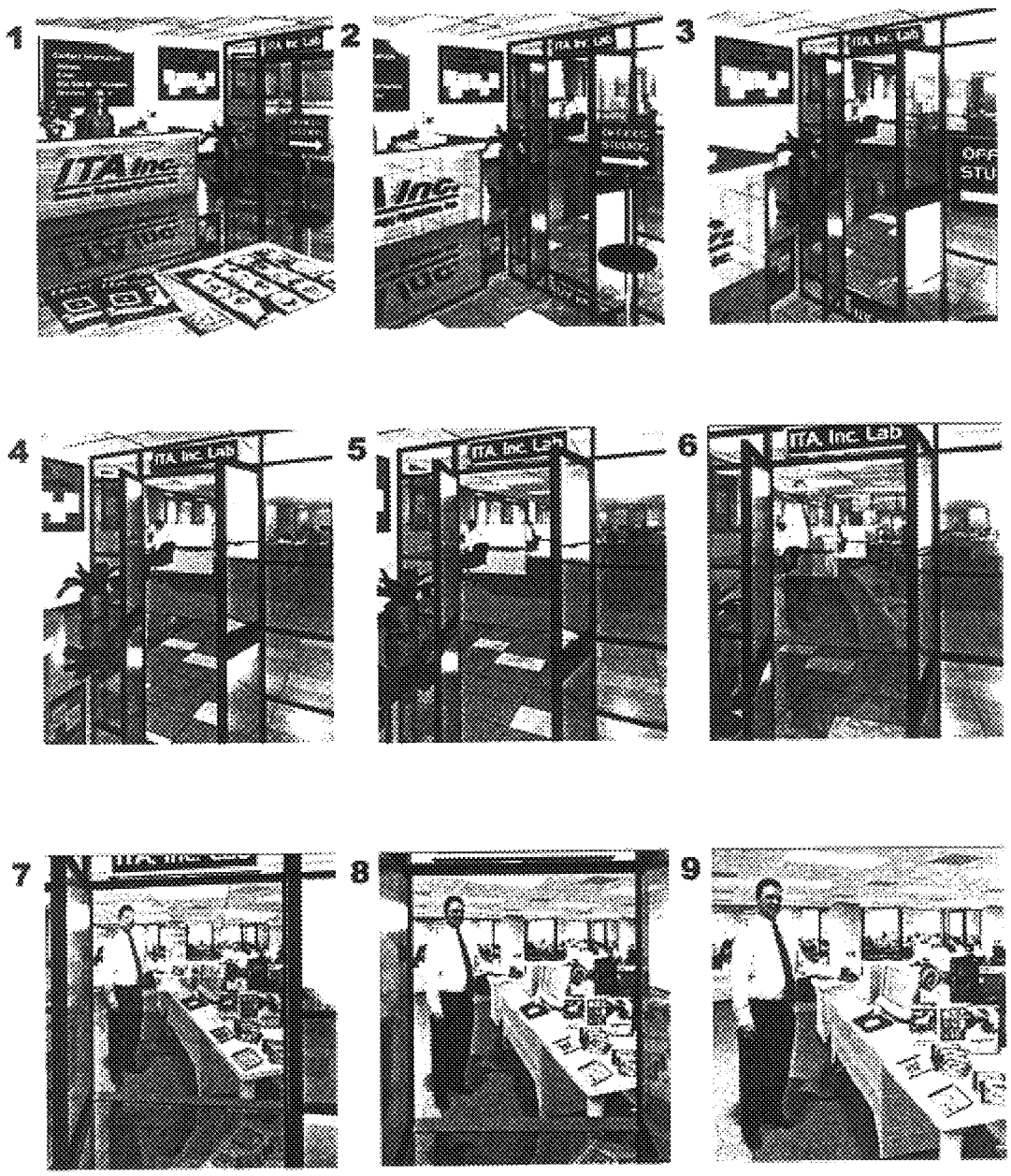
FIG. 34A "CAPABILITIES TRANSITION ANIMATION RESULTING FROM CAPABILITIES I.E. ACTIVE BY SINGLE LEFT CLICK STATE"

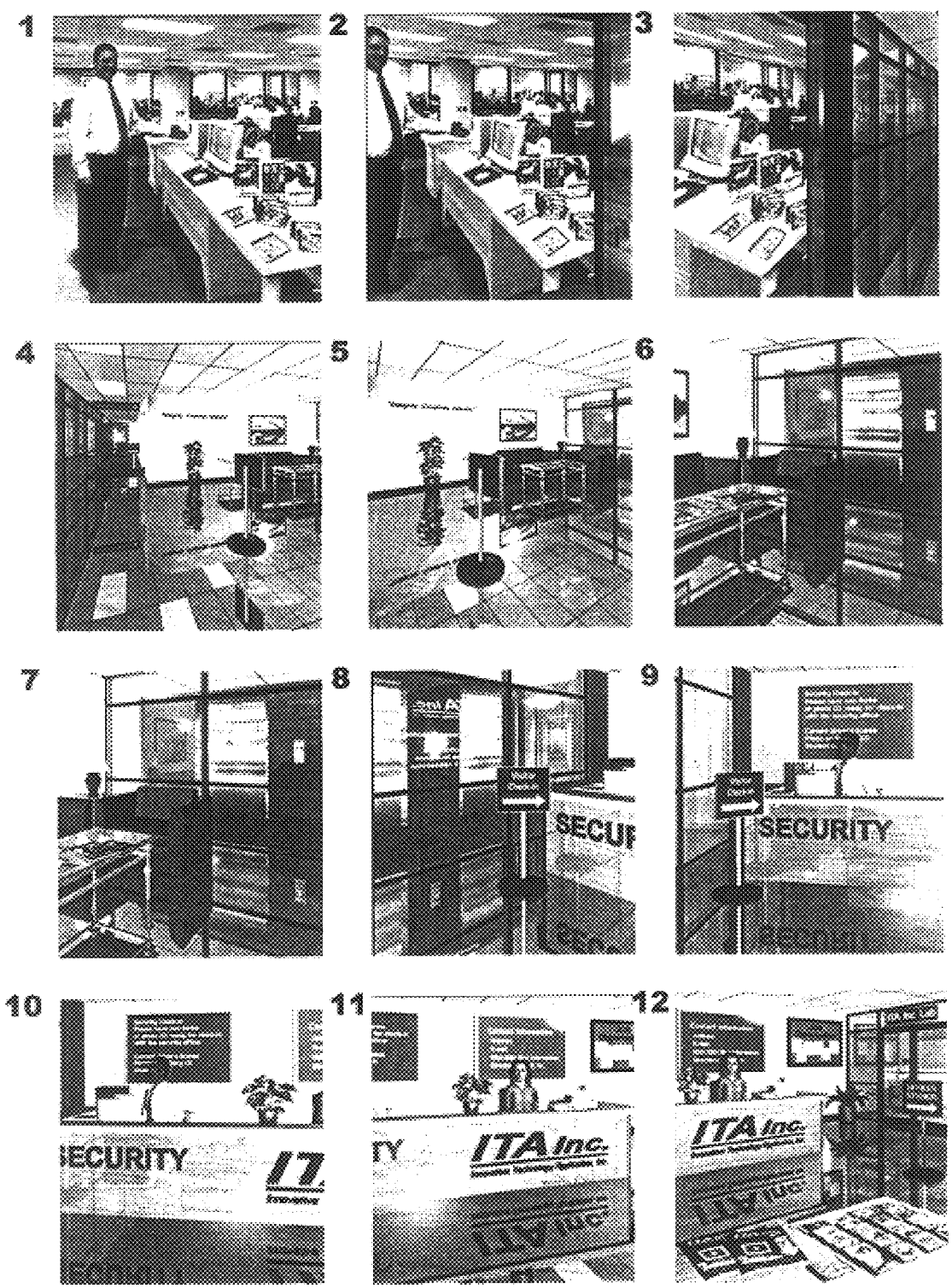
FIG. 34B "CAPABILITIES TRANSITION ANIMATION RESULTING FROM HOME BUTTON I.E. ACTIVE BY SINGLE LEFT CLICK STATE"

FIG. 35 "CAPABILITIES TRANSFORMATION SUBMENU EXAMPLE"

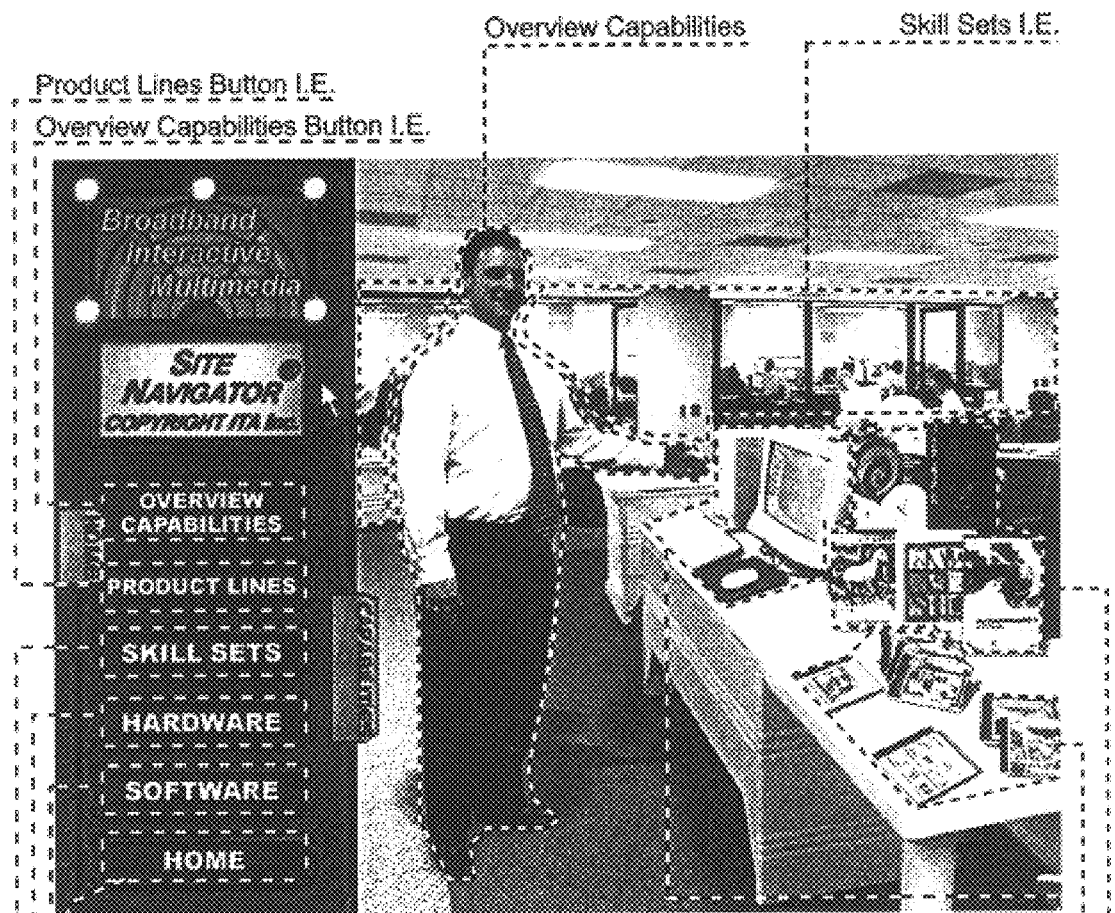
FIG. 36 "CAPABILITIES TRANSFORMATION SUBMENU EXAMPLE NEW I.E.s"

IMMERSIVE INTERFACE INTERACTIVE MULTIMEDIA SOFTWARE METHOD AND APPARATUS FOR NETWORKED COMPUTERS

BACKGROUND OF THE INVENTION

1. Field of the Invention

The present invention relates to an immersive interface interactive multimedia software method and apparatus utilizing a pseudo-physical metaphor and robust user feedback, which facilitates quick and intuitive user interaction, control, and activity between computers on a network.

2. Description of the Related Art

Networks are generally defined as two or more individual computers connected together by some computer hardware (cables, for example) or by wireless means, to facilitate information sharing, processing power sharing, and communication. The computers share information between them using "requests" and "services"; one computer typically "requests" information, while another computer on the network "services" the request. Sometimes the "requesting" computer is referred to as a "client", while the "servicing" computer is referred to as a "server", but almost all computers "request" and "service" requests from other computers, whether defined as a client, a server, or neither. With respect to the Internet and the World Wide Web, a "servicing" computer is sometimes called a "Web Site".

The Internet and World Wide Web are examples of public networks formed by millions of computers. Computers on these networks routinely "request" and "service" other computers millions of times each second. A vast majority of the computers on these public networks are Personal Computers (PCs). People routinely "request" information about certain web sites, and another computer on the network, the web site computer, "services" the request by providing the requested information.

The PC is often a significant element, particularly as clients, in most networks. The PC is rapidly evolving and changing, both in hardware and in software. There is a standard in software interfaces today that has roots in the Microsoft Windows products—typical features of these interfaces are scrolling windows, icons, resizable windows, radio buttons, hypertext, and menu bars. The hardware associated with most PCs includes a pointing device, such as a mouse, pen, touch-screen, stylus, trackball, etc.

The standard software interface on the PC (and subsequently, the Internet, or World Wide Web) contains numerous tools or controls for navigating and accessing information. Buttons, text, hypertext links, images and/or icons typically are combined together to provide the user with a manner to interact with the requesting and servicing computers to provide the necessary data, navigation, and/or services the user requires. Simply put, a standard interface can possess "controls", tools for manipulating the interface, and "display" the information that is displayed (which can be text or data). Most controls are utilized using either keyboard input or pointing device (mouse, trackball, touchscreen, tablet, etc) input.

There are a number of difficulties in using the standard software interfaces. Due to the huge number of computer sites, typically new users must learn or memorize the symbology of the buttons/icons/controls, and what each represents. There is a great diversity of uses of the controls, with every site utilizing the controls differently. Users often need some background in the Microsoft Windows use of windows such as the minimize, maximize, and close features. The large amounts of data on Web sites are indexed or organized differently, and time must be spent learning how the information is organized before the user can access what is needed. Many times the user must spend a considerable amount of time reading the site, comprehending the information, and learning the navigation of the site—many times through trial and error. The narrow bandwidth of the Internet today means long delays waiting for images and pictures, and misused controls mean delays in achieving the desired results. Most sites today totally rely upon the use of text, which forces users to read and interpret in order to access the information they desire. Finally, users are required to know when to click, when to double click, and where to click or double click, which is not always apparent. The use of the keyboard and pointing device for controls is also highly varied across sites, further complicating the task.

In the aggregate, the use of a standard PC interface over the network to gather information from a site (or servicing computer on the network) can be challenging due to complexity in controls, unapparent organization of vast amounts of information, and the dependency upon users with solid cognitive skills in reading and comprehending to evaluate and then navigate to the information that they require. Speed of access is also an issue, as finding the desired information on a vast network like the Internet is often a challenging and time consuming task.

At this point in time, it is technologically challenging and difficult to provide a highly interactive, heavily multimedia navigation interface such as the present embodiment on the Internet/World Wide Web.

For example, one aspect of the invention, streaming video, is very hard to accomplish at present and only few tools are currently available to support this feature. Browsers and plug-ins are typically complicated, poorly documented, and produce variable results across multiple browser versions and operating systems. A heavy investment in hardware, and internet connections are required. Also, the nature of hyper-text markup language, e.g., .html, on the Internet/World Wide Web, are text focused and present difficulties in multimedia. Significantly, the use of proprietary software and costs of licensing can be prohibitive to be capable to run a multimedia-intensive navigation interface.

Through-put issues are a major concern and challenge in creating a high interactivity, multimedia-heavy interface on the Internet/World Wide Web. For example, the Internet/World Wide Web does not readily support true color graphics because true color pictures are very large files, that take a lot of time to download. Audio is challenging to make work on the Internet/World Wide Web, and requires a sound card. Handling video is also difficult to do, and on-demand animations and/or videos are very hard to accomplish on the Internet/World Wide Web. Even still further, compression techniques are typically rather complicated for pictures, audio and video. Compression achieves benefits in throughput, but unfortunately requires time to decompress data. Plug-ins also require download time. Ultimately, the throughput issue is a serious factor and is very difficult to address. The low throughput and long delays make the creation of a truly multimedia navigation interface very undesirable on the present Internet/World Wide Web.

Additionally, the multiplicity of computer configurations that are currently available (hardware, operating system, and browser), provide challenges to creating a truly multimedia navigation interface. Sites must profile their users, and many times must be prepared to disallow large numbers of users who will not be able to access the site due to having unsupported hardware, browser, and/or operating system.

A navigation interface must be able to support a large number of user accesses at the same time, and due to through-put issues on the Internet/World Wide Web, providing a truly multimedia navigation interface is a challenge, in that the slowness in accessing such a navigation interface due to the through-put problems would cause many users to give up and go elsewhere—a result that many sites find undesirable at this time.

Finally, security issues and difficulty in protecting proprietary information, media, and data on the Internet/World Wide Web make multimedia navigation interfaces not very desirable. In that regard, the vast majority of web sites today are mostly plain text with simplistic graphics and organizations. This simplistic organization decreases the need and desire for having a more sophisticated (e.g., multimedia) and technologically challenging web site.

SUMMARY OF THE INVENTION

The present invention provides an "Immersive Interface" that allows a user to utilize an interface where the controls and data organization of the interface are constructed using a pseudo-physical graphical metaphor with multimedia feedback, making controls and their usage more intuitive and more easily apparent, enabling faster understanding of interface control, faster access, reduced mistakes, and easier, multimedia guided interaction with the computer. The interface is immersive in the sense that the interface projects a physical environment that the user finds themselves immersed in, so as to make the navigation and control processes intuitive and relatively easy to perform, irrespective as to the level of computer knowledge of the user.

The immersive interface may be provided by way of a method for providing an interface to a user for at least one page of information. The method includes displaying the page to the user, the page including a plurality of separate interactive elements positioned at different locations on the page to provide a frame of reference to the user. The method also includes, as the user moves a pointer device to various positions on the page, providing feedback to the user that informs the user as to information related to one of the plurality of separate interactive elements that the user is currently positioning the pointer device on. The feedback is at least two of text feedback, visual imagery feedback, and audio feedback.

The immersive interface may also be provided by way of a method for providing an interface to a user for navigating a web site that includes a plurality of web pages having a particular hierarchical structure, which includes displaying an initial web page to the user that corresponds to a home web page, the initial web page including a plurality of separate interactive elements positioned at different locations on the initial web page to provide a frame of reference to the user. The method also includes, as the user moves a pointer device to various positions on the web page, changing characteristics of the initial web page such that when the pointer device is currently located at a position on the initial web page corresponding to one of the plurality of separate interactive elements, a visual characteristic of the one of the plurality of separate elements changes and the visual characteristic of another of the plurality of separate interactive elements changes. The another of the plurality of separate interactive elements is logically related to the one of the plurality of separate interactive elements.

The immersive interface may also be provided by a method for browsing a web page, which includes displaying the web page to the user, the web page including a plurality of separate interactive elements positioned at different locations on the web page. The method also includes, as the user moves a pointer device to various positions on the web page, providing feedback to the user that informs the user as to information related to one of the plurality of separate interactive elements that the user is currently positioning the pointer device on. The feedback is at least two of text feedback, visual imagery feedback, and audio feedback.

The immersive interface may also be accomplished by a computer program product that provides an interface to a user for navigating a web page, which includes first program code that displays the web page to the user, the web page including a plurality of separate interactive elements positioned at different locations on the web page. The computer program product also includes second program code that, as the user moves a pointer device to various positions on the web page, provides feedback to the user that informs the user as to information related to one of the plurality of separate interactive elements that the user is currently positioning the pointer device on. The feedback is at least two of text feedback, visual imagery feedback, and audio feedback. The first and second computer program code may include hardware components along with software.

The immersive interface may also be accomplished by a computer program product that provides an interface to a user for navigating a web site that includes a plurality of web pages having a particular hierarchical structure, which includes first program code that displays an initial web page to the user that corresponds to a home web page, the initial web page including a plurality of separate interactive elements positioned at different locations on the initial web page to provide a frame of reference to the user. The computer program product also includes second program code that, as the user moves a pointer device to various positions on the web page, changes characteristics of the initial web page such that when the pointer device is currently located at a position on the initial web page corresponding to one of the plurality of separate interactive elements, a visual characteristic of the one of the plurality of separate elements changes and the visual characteristic of another of the plurality of separate interactive elements changes. The another of the plurality of separate interactive elements is logically related to the one of the plurality of separate interactive elements. The first and second computer program code may include hardware components along with software.

The immersive interface also includes a computer program product for use in browsing a web page, which includes first program code for displaying the web page to the user, the web page including a plurality of separate interactive elements positioned at different locations on the web page. The computer program product also includes second program code that, as the user moves a pointer device to various positions on the web page, provides feedback to the user that informs the user as to information related to one of the plurality of separate interactive elements that the user is currently positioning the pointer device on. The feedback is at least two of text feedback, visual imagery feedback, and audio feedback. The first and second computer program code may include hardware components along with software.

BRIEF DESCRIPTION OF THE DRAWINGS

The invention will become more fully apparent from the following detailed description when read in conjunction with the accompanying drawings with like reference numerals indicating corresponding parts throughout, and wherein:

FIG. 1A shows one example of an initial screen for an immersive interface according to the invention;

FIG. 1B shows Orientation Information that is provided to the user upon first encountering the initial screen of FIG. 1A, where the Orientation Information may be provided either audibly, textually on the initial screen, or both;

FIGS. 1C–1F show a sequence of images that are used to imitate the receptionist speaking, while the Orientation Information is being provided to the user audibly;

FIG. 2 shows a "Frame of Reference" portion of the initial screen;

FIG. 3 shows the interactivity elements of the initial screen;

FIG. 4 shows the "Contact Us" interactivity element;

FIG. 5 shows the "Corporate Overview" interactivity element;

FIG. 6 shows the "Capabilities" interactivity element;

FIG. 7 shows the "Portfolio" interactivity element;

FIG. 8 shows the "Job Opportunities" interactivity element;

FIG. 9 shows the "Site Navigator" interactivity element;

FIG. 10 shows the interactivity elements that are presented as buttons on the left-hand side of the initial screen;

FIG. 11A shows an inactive state of the "Corporate Overview" interactivity element;

FIG. 11B shows an inactive state of the "Capabilities" interactivity element;

FIG. 12 shows an active-by-rollover state of the "Corporate Overview" interactivity element;

FIG. 13 shows a series of sequential images of the "Corporate Overview" interactivity element in the active-by-rollover state;

FIG. 14 shows the text of the Orientation Brief provided when the "Corporate Overview" interactivity element enters the active-by-rollover state;

FIG. 15 shows the "Corporate Overview" interactivity element in the active-by-rollover state, with emphasis on the glow/highlight on the Office Studios sign;

FIG. 16 shows a series of sequential images of the image of the receptionist, whereby that image appears as if the receptionist is talking while the Orientation Brief is provided when the "Corporate Overview" interactivity element enters the active-by-rollover state;

FIG. 17 shows the "Corporate Overview" intefactivity element that has been put into the active by another interactivity element state, and the corresponding screen text changes;

FIG. 18 shows the "Capabilities" interactivity element that has been placed into the active by rollover state;

FIG. 19 shows the "Capabilities" interactivity element that has been placed into the active by rollover state, which shows the laboratory doors opened and highlighted;

FIG. 20 shows the text of the Orientation Brief provided when the "Capabilities" interactivity element enters the active-by-rollover state;

FIG. 21 shows a series of sequential images of the image of the receptionist, whereby that image appears as if the receptionist is talking while the Orientation Brief is provided when the "Capabilities" interactivity element enters the active-by-rollover state;

FIG. 22 shows the "Capabilities" interactivity element that has been placed into the active by another interactivity element state;

FIG. 23A shows a series of sequential images that mimic one moving from the receptionist area of the initial screen to a conference room;

FIG. 23B shows a series of sequential images that mimic one moving from a conference room back into the receptionist area of the initial screen;

FIG. 24 shows the "Corporate Overview" submenu, which is provided after the series of sequential images of FIG. 23A have finished being displayed;

FIG. 25 shows the various interactivity elements of the "Corporate Overview" submenu, with each one shown in a respective dashed region;

FIG. 26 shows the text of the Orientation Brief provided each time when the "Corporate Overview" submenu is shown on the display;

FIG. 27 shows the "Capabilities" submenu;

FIG. 28 shows the various interactivity elements of the "Capabilities" submenu, with each one shown in a respective dashed region;

FIG. 29 shows the text of the Orientation Brief provided each time when the "Capabilities" submenu is shown on the display;

FIG. 30 shows the "Capabilities" interactivity element that has been placed in the active by rollover state, which in turn results in the "Capabilities" button on the left-hand portion of the screen being placed in the active by another interactivity element state;

FIG. 31 shows the "Capabilities" button that has been placed in the active by rollover state, which in turn results in the "Capabilities" interactivity element on the right-hand portion of the screen being placed in the active by another interactivity element state;

FIG. 32 shows the "Contact Us" close-up submenu, which is provided when that "Contact Us" interactivity element has been selected on the initial screen;

FIG. 33 shows the various interactivity elements of the "Contact Us" submenu;

FIG. 34A shows a series of sequential images that mimic the movement from the receptionist area to the laboratory, in an alternative configuration, when the "Capabilities" interactivity element is selected on the initial screen;

FIG. 34B shows a series of sequential images that mimic the movement from the laboratory to the receptionist area of the initial screen, in an alternative configuration, when the "Home" Button interactivity element is selected on the "Capabilities" submenu.

FIG. 35 shows the "Capabilities" transformation submenu, which is provided when the "Capabilities" interactivity element has been selected on the initial screen; and FIG. 36 shows the various interactivity elements of the "Capabilities" transformation submenu.

DETAILED DESCRIPTION OF THE PREFERRED EMBODIMENT

A preferred embodiment of the present invention will be described in detail hereinbelow, with reference to the drawings.

The present invention is directed to an immersive interface that appears to the user as an easily recognizable real-life/virtual scene—the pseudo-physical metaphor. This scene establishes a commonly understood "frame of reference" when first looking upon the interface. The controls of the interface are embedded within the scene as easily recognizable objects that have some relationship with each other and/or the scene. At first glance, based upon which objects are present, what the objects physically represent, and the relationship of the objects, the user can quickly and intuitively guess at how the controls are organized and select the objects of their choice.

In the present invention, the act of accessing the interface causes the interface to brief the user, essentially explaining itself, its contents, and/or its controls. Sound, video, animations, and/or various types of multimedia introduce the user to the scene and proceed to provide audio and visual explanations about each of the objects, or "interactive elements", on the screen. The user is exposed to the various navigation options of the interface and how they work, whether by single clicking on text, single clicking on buttons, or single clicking on the objects within the scenes themselves, for example. The explanation can be interrupted immediately if the user is already familiar to the interface by simply using the controls. The user requires virtually no training in the use of the interface. The user also is not required to have any understanding of the site's organizational structure to be able to quickly observe and utilize the interface controls.

Now briefed on the controls of the interface, the user is able to manipulate the controls to begin to understand how the site is organized. As the user explores the controls, the interface provides instant, multimedia, detailed feedback on the purpose of each interaction element, effectively providing the user with an understanding of how the control functions without having to exercise the control. The user quickly understands the controls and intuitively perceives the data structure and organization of this interface and can make decisions and act appropriately. The robust multimedia content and intuitive design enable the user to fully comprehend the organization of the information and confidently utilize the interface controls.

Ultimately, the interface robustly provides specific multimedia feedback to the user depending upon every user action; movement of the pointing device; keystrokes, non-movement of the device over a period of time; single left clicks, single right clicks, simply moving the pointing device on top of an interactive element; or double-clicking using either the right, left, or center buttons (if present) of the pointing device. The feedback reveals how the controls work, what the result of certain actions on the controls will yield, and provide visual and audio feedback that the user has moved the onto a control. The feedback provided to the user can result in a new scene, a modification of the existing scene, navigation, execution of other programs, the display of typical Windows display elements and controls, or data in a myriad of forms, whether textual, database, or multimedia including but not limited to video, audio, music, and/or animations.

As explained above, the present invention provides an "immersive interface" method and apparatus (computer program product) utilizing a pseudo-physical graphical metaphor for networked computers which facilitates quick and intuitive user interaction, control, and activity with another computer on the network. In the following description, numerous specific details are set forth in order to provide a more thorough description of the present invention. It will be apparent, however, to one skilled in the art, that the present invention may be practiced without these specific details. Well-known features have not been described in detail so as not to unnecessarily obscure the invention.

The present invention can be implemented on a general purpose computer, such as an IBM, Dell, or Compaq computer, just to name a few of the companies that manufacture personal computers and laptops. In particular, the present invention can be implemented on a general purpose multimedia computer, such as one with a CD-ROM drive, a sound card, a graphics card, by way of example and not by way of limitation.

The computer system on which the present invention is implemented should also possess some mechanism for becoming networked, either through a modem which allows dial up networking and internet access, a network card for permanent networking, or other such means for connecting to a network.

The computer system described above is for purposes of example only. The present invention may be implemented in any type of computer system or programming or processing environment. The interface may be executing or residing on either the requesting computer, the servicing computer, or most probably, both computers. The controls of the immersive interface provide instructions to both requesting and servicing computers. For example, the interface instructs the update of the display and provision of visual feedback to the requesting computer while it also instructs the servicing computer to access stored data.

This Detailed Description of the Preferred Embodiment section is divided into three main areas of discussion: Concept of Operation, where the usage of an example implementation of an immersive interface is described in narrative and figures; Definition and Component Descriptions, where an immersive interface is defined and its components are identified and described; and Component Functioning, where the function of each of these components is fully explained and diagramed, as necessary.

Concept of Operation

The "Immersive Interface" according to the present invention provides the ability for a user to utilize an interface where the controls and data organization of the interface are intuitive and readily apparent, enabling faster understanding of interface control, faster access, reduced mistakes, and easier, multimedia guided interaction with the computer. The Concept of the Operation section will refer to an example implementation of an immersive interface with references to figures to provide a general understanding and background of the invention.

The interface is triggered by user activity, whether it is typing in the name of the servicing computer, clicking on an access hyperlink/hypertext, or any other mechanism for initiating a program.

The interface program initiates by either entering an intermediate screen which may request some setup data such as connection speed, plug-in status, configuration info, etc., or proceeding directly into the first "immersive interface" screen. See FIG. 1A "Initial Screen" to see the first picture of the example immersive interface.

Before the user can interact with the computer, an Orientation Brief starts which explains the interface to the user, either audibly, visually, or both. See the text box shown in FIG. 1B, "Orientation Brief Audio Transcript". In addition, the receptionists lips move as the sound of a voice speaking about the interface is heard. FIG. 1C, FIG. 1D, FIG. 1E, and FIG. 1F show a sequence of images of the receptionist, which mimic the receptionist speaking by way of her lips moving. This sequence of images, or animation, creates the illusion that the receptionist is speaking to the user while the audio is being played. This multimedia approach captures the users attention and subtly instructs them on the interface, its organizational setup, and how to use its controls.

The "Initial Screen" in FIG. 1A corresponds to familiar physical surroundings of a typical business reception area.

The right-hand portion of the initial screen corresponds to a "Frame of Reference", as shown within the dotted area in FIG. 2. FIG. 3 shows all of the "Interactivity Elements" (I.E.s) that are provided on the initial screen. As shown in FIG. 3, interactivity elements of the left-hand portion of the screen are shown as button controls, and the interactivity elements on the right-hand portion of the screen that corresponds to the "Frame of Reference" are controls that are concealed as common objects (e.g., doors, signs, catalogs, bulletin boards) within the scene. The disposition of the interactivity elements and the location of the Frame of Reference on the right-hand side of the screen and the button controls on the left-hand side of the screen is just for example purposes, and other positions of such elements may be contemplated while remaining within the scope of the invention as described herein.

FIG. 4 shows the "Contact Us" I.E. within a dashed line in that figure, whereby the receptionist is an interactive element within the Frame of Reference. FIG. 5 shows the "Corporate Overview" I.E. within a dashed line in that figure, FIG. 6 shows the "Capabilities" I.E. within a dashed line in that figure, FIG. 7 shows the "Portfolio" I.E. within a dashed line in that figure, and FIG. 8 shows a "Job Opportunities" I.E. within a dashed line in that figure. The "Job Opportunities" I.E. is an image of a Job Opportunities board on a wall behind the receptionist's desk, as may exist in many receptionist areas for companies.

FIG. 9 shows the "Site Navigator" that is located on the left-hand side of the screen, where the Site Navigator possesses typical button/text controls. Users that are comfortable with text or button based interaction are able to single-left-click on these buttons to navigate in typical Microsoft Windows fashion. Each of the individual interactive elements in the Site Navigator are highlighted in FIG. 10, where these correspond to the normal button controls of the interface.

In the preferred embodiment, each of the I.E.s has multiple states, each of which causes activities to be performed by the interface. Examples of states designed into the example interface are inactive; active by roll-over; active by single left click; and active by another Interactive Element.

For brevity's sake, the discussion of I.E. states will focus on two specific interactivity elements within the example immersive interface: "Corporate Overview" (see FIG. 5 "Corporate Overview I.E.") and "Capabilities" (see FIG. 6 "Capabilities I.E").

One Interactive Element state is 'Inactive', which is shown in FIG. 11A for the "Corporate Overview" I.E., and as shown in FIG. 11B for the "Capabilites" I.E. Typically, the initial appearance of an I.E. is its inactive state. That is, in the preferred embodiment, each of the interactive elements is initially shown in the initial screen in an inactive state (unless the cursor happens to be located on an I.E., to thereby place that I.E. in the active by rollover state).

Another I.E. state is 'Active by Rollover', which is the state in which the cursor (or pointing device) is positioned on an I.E. FIG. 12 shows the active by rollover state for the "Corporate Overview I.E. Note the location of the cursor (shown by a hand in the figure) on top of the "Corporate Overview" I.E. When a user uses their pointing device to place the cursor onto an I.E. without clicking, that triggers the I.E to enter the 'active by rollover' state. An example can be seen when the user rolls the cursor onto the "ITA" letters (see FIG. 1), the logo, or "Corporate Overview" I.E. The state of the "Corporate Overview" I.E. now switches from 'inactive' to 'active by rollover'. In the preferred embodiment, this triggers five events: an animation on the logo (see series of images in FIG. 13 "Corporate Overview Active by Rollover Logo Animation"); the sound of the receptionist speaking (see FIG. 14 "Corporate Overview Active by Rollover Audio Transcript", which is the actual speech spoken by the receptionist, and which may also appear as a text box on the screen in an alternative embodiment); the highlight on the sign (see FIG. 15 "Corporate Overview Active by Rollover Highlight", where the periphery of the "Corporate Overview" I.E. is highlighted (such as being presented in a yellow glow); an animation to run which causes the receptionist to appear as if she is speaking (see FIG. 16 "Corporate Overview Active by Rollover Receptionist Animation"); and finally, the new screen image which appears such that the "Corporate Overview" button is highlighted and text is added to the display screen on the Site Navigator that describes the content of the I.E. (see FIG. 17 "Corporate Overview Active by Another I.E. Button Highlight & Screen Text", where the screen text changed to display "Click here for a summary of ITA Inc."). Although this screen change appears during a rollover of the Capabilities I.E., it's actually an example of a different state, 'Active by Another I.E.', which will be discussed later. As all these events occur very quickly, it appears to the user that they all resulted from having placed the pointing device on the "Corporate Overview" I.E.

Similarly, FIG. 18 shows the "Capabilities" I.E. in the Active by Rollover State, which shows the image of the laboratory doors opening when the user utilizes the pointing device to place the cursor on top of the laboratory doors (or anywhere within the "Capabilities" I.E. shown by the dashed line in the figure). The state of the "Capabilities" I.E. now switches from the "inactive" to "active by rollover" state by virtue of the cursor (shown by a hand in the figure) being positioned over it. This triggers four different events: the new image of the laboratory doors opened and highlighted (FIG. 19 "Capabilities Active by Rollover State Image and Highlight"); the sound of the receptionist speaking (see FIG. 20 "Capabilities Active by Rollover State Audio Transcript"); the animation of the receptionist speaking (see FIG. 21, "Capabilities Active by Rollover State Receptionist Animation"); and the new screen image in which the "Capabilities" button is highlighted and the screen text on the Site Navigator is updated (see FIG. 22 "Capabilities Active by Another I.E. Button Highlight and Screen Text"). Although this appears during a rollover of the Capabilities I.E., it's actually an example of a different state, 'Active by Another I.E.', which will be discussed later.

Another I.E. state is 'Active by Single Left Click'. By clicking the left button on the pointing device a single time while the cursor is on top of an I.E., the user is able to trigger an I.E.'s 'Active by Single Left Click' state. In the preferred embodiment of the immersive interface, when the user single left clicks on the Corporate Overview I.E., an animation appears which guides the user around the corner into a conference room (FIG. 23A "Corporate Overview Transition Animation Resulting from Corporate Overview I.E. Active by Single Left Click State", which corresponds to a series of images that simulate the movement from the receptionist area to the conference room, e.g., going around a corner and then going into the conference room). This plays briefly, e.g., 1–2 seconds, after which the "Corporate Overview Submenu" as shown in FIG. 24 appears. This submenu introduces several new I.E.s (see FIG. 25 "Corporate Overview Submenu Interactivity Elements"). Another orientation brief (see FIG. 26 "Corporate Overview Submenu Orientation Brief Audio Transcript") is provided audibly and or textually (which may or may not be accompanied by animation of someone speaking in this scene), and the user can now rollover additional new I.E.s with new functions. Note that the submenu logically follows from the initial Frame of Reference. That is, the Corporate Overview submenu by a user clicking on the "Office Studios" sign on the main screen, and then by "moving" the user from the receptionist area to a conference room where information on the corporation can be obtained. By maintaining a link to the original frame of reference, the user clearly understands their own location in the organization of the site. Accordingly, FIG. 23B "Corporate Overview Transition Animation Resulting from Home Button I.E. Active by Single Left Click State" shows the series of pictures which are played to whisk the user back from the conference room to the initial main menu with receptionist. The transition animation assists the user in understanding their return to the start location using a physical metaphor.

Similarly, by clicking the left button on the pointing device while the cursor is on top of the Capabilities I.E., the user is able to trigger the single left click state. In this instance the user is immediately presented with a picture of the inside of the laboratory (see FIG. 27 "Capabilities Submenu") which introduces several new I.E.s (see FIG. 28 "Capabilities Submenu Interactive Elements"). Note that FIG. 27 is a screen on which an actual photograph of a laboratory is provided, as opposed to the pure animation shown in the initial receptionist screen. Whether or not to use pure animation, digitized photographs, or some combination of the two and/or other visual elements, is of course up to the designer. Like the initial screen, when the user enters into the Capabilities submenu, an orientation brief plays (see FIG. 29 "Capabilities Submenu Orientation Brief Audio Transcript", which may also appear as a text box on the submenu, if so desired) which explains the layout and purpose of the I.E.s to the user. Note that this submenu did not contain an introductory animation, as the logical link to the initial Frame of Reference is apparent by virtue of the doors opening on the initial Frame of Reference to thereby enter the laboratory. In other words, the user had clicked on open laboratory doors and now finds themselves standing within the laboratory faced with more I.E.s.

Another I.E. state is 'Active by Another I.E.' An example of this state can be seen in the example when the user rolls over the Corporate Overview I.E. causing another I.E., the Corporate Overview Button I.E. , to be triggered into its rollover state. (see FIG. 17 Corporate Overview Active by Another I.E. Button Highlight and Screen Text). In the preferred embodiment of the immersive interface, all I.E.s in the frame of reference have been partnered to a corresponding button I.E. (in the Site Navigator). When the first partner goes into active by rollover state, the second goes into active by another I.E. state—and vice versa. As the Capabilities example shows, rolling over the Capabilities I.E. causes the Corporate Overview Button I.E. to go into active by another I.E. state, while rolling over the Capabilities Button I.E. causes the Capabilities I.E. to go into active by another I.E. (see FIG. 30 "Capabilities I.E. in Active by Rollover State Causes Capabilities Button I.E. to Active by Another I.E. State" and FIG. 31 "Capabilities Button I.E. in Active by Rollover State Causes Capabilities I.E. to Active by Another I.E. State". Another possible configuration is to have some I.E. not be partnered by another I.E., so that those I.E.s will not have an active by another I.E. state.

The various states of the Interactive Elements serve several purposes. First, they provide feedback to the user that the object is a control. Second, they trigger feedback which indicates to the user what activity will result should the user select the control. Third, should the control lead to more data, the user is provided feedback that provides an overview of the main topics of information available so that the user does not have to exercise the control in order to understand it, avoiding trial and error delays. Fourth, the design of the I.E.s utilize the user's understanding of the frame of reference so that, after viewing one I.E. and understanding what it controls, the user's understanding of the frame of reference relationship of the I.E. objects enables the user to intuitively guess what the other objects on screen are intended to control. The user can usually interact with one control, understand the overall organization of the controls, and then navigate to their intended objective without significant trial and error with the controls to understand how they work.

Selection of I.E.'s can then yield numerous results such as submenus of the immersive interface, more traditional Windows controls, more traditional Windows data displays, the launch of additional programs, exit from the interface, or any other computer activity.

The preferred embodiment provides for two primary techniques for submenus of the immersive interface: 'closeup submenus' and 'transformation submenus'. Both approaches continue to utilize the "frame of reference" understanding of the user, allowing continued intuitive leaps by the user on how objects in the submenu reflect the data organization and how the controls function. Depending upon the implementation, a closeup or transformation submenu will be preceded by an animation, video, audio, or multimedia animation or sequence of events which helps to introduce the submenu or clarify the linkage to the frame of reference.

'Closeup' sub-menus are simply a zoom-in view of the triggering I.E. As the new, larger view fills the screen, new I.E. objects are represented in the detail of the original I.E. object. Referring back to the example implementation of an immersive interface, the "Contact Us" I.E. utilizes a 'Closeup' submenu when left-clicked. FIG. 4 shows the "Contact Us" I.E. in its inactive state. When left-licked, the "Contact Us Closeup Sub-menu Example" as shown in FIG. 32 appears. Note that the sub-menu follows the original Frame of Reference of a business reception area, but now the "Contact Us" I.E. is much larger, and new I.E.s are enabled in the details of the object (see FIG. 33 "Contact Us Closeup Sub-menu Example New I.E.s"). In this particular example, each of the submenu I.E.s are text-based (rather than objects), but some or all may alternatively be image-based. An example of an object-based submenu could be a frame of reference which appears to be a top view of a workshop, with one of the I.Es being a top view of a tool chest. Selection of the top view of the tool chest would then become a "closeup" submenu where the new I.E.s are various types of tools located inside the top of the chest.

Transformation sub-menus result when the frame of reference screen undergoes some type of display change. One single I.E. may change, several I.Es may change, or the entire screen may shift. Transformation submenus, however, are changes within the context of the frame of reference. Referring to the example implementation, FIG. 6 "Capabilities I.E." is an image of a set of laboratory doors. The 'active by rollover state' causes the doors to swing open. Selection by left click on the Capabilities I.E. then triggers an animation of moving over to the opening doors to peer inside (see FIG. 34A "Capabilities Transition Animation Resulting from Capabilities I.E. Active by Single Left Click State"). The new transformation submenu appears as a view of the interior of the lab (see FIG. 35 "Capabilities Transformation Submenu Example") with new I.E.s (see FIG. 36 "Capabilities Transformation Submenu Example New I.E.s"). The transformation transformed the viewing area, but the animation and the layout of the submenu allows the user to maintain an understanding of their location within the frame of reference. FIG. 34B "Capabilities Transition Animation Resulting from Home Button I.E. Active by Single Left Click State", which occurs when the "Home Button" I.E. on the submenu is clicked, shows a series of picture mimicking the users perspective of turning around and returning to a seat on the sofa. This then transitions into the original, initial main menu screen with a receptionist. These transitions are important for supporting the user's understanding of the frame of reference and the user's navigation of the site structure. Another example of a transformation may simply be a set of drawers in a desk opening to reveal the contents therein, or an opening of a catalog in the "Portfolio" I.E. upon selection of that I.E. The contents of the drawers are then new I.E.s that provide additional controls.

Definition and Component Description

The Immersive Interface method and apparatus provides for a highly interactive multimedia computer interface method utilizing a pseudo-physical metaphor and robust user feedback that facilitates quick and intuitive user interaction, control and activity between computers on a network. The pseudo-physical metaphor is established through a highly graphical 'Frame of Reference' and design of 'Interactive Elements' to appear as logical objects within the 'Frame of Reference.' Some of the Interactive Elements may appear as more traditional or typical software controls such as buttons or hypertext. The graphics of the 'Frame of Reference' may be virtual reality (rendered), photographs, videos, animations, or any combination/composition of digital media. The high degree of interactivity and robust feedback are achieved through multiple 'states' of 'interactive elements' and sophisticated 'User Action/Input Feedback Principles' that provide visual image (and related visual imagery techniques such as animations, video, etc.), visual text, and audio responses throughout the use of the interface. Ease of use is achieved through the high degrees of multimedia feedback and the 'Orientation Briefs'. The relation of the pseudo-physical interactive elements within the frame of reference and continued relationship throughout the interface through 'Submenus' aids the user in understanding the organization of the site and assists the user to remember their location while navigating within the site.

Accordingly, the integral components in the immersive interface include the: Frame of Reference; User Action/Input Feedback Principles; Interactivity Elements with multiple states; Sub-menus, and Interface Orientations. Additional components can include Traditional Controls/Input Techniques and Traditional Display Techniques.

The Frame of Reference sets the backdrop for the entire use of the interface and is preferably designed with the intended user in mind. The Frame of Reference is made so as to be easily recognizable to the intended user, and the Frame of Reference is displayed or presented as if the user is "immersed" into a scene with which the user is familiar, typically using a physical metaphor. The scene may be composed of a single photograph, a collage of photographs, virtual reality/rendered elements, or a combination thereof—any set of images that create a pseudo physical environment. The objects/I.E.s within the scene are logical to that scene. Ultimately, each of the objects within the scene directly visually correlate to the operation/intent of the control or directly visually correlate to the structure, topic, or type of data that will be accessed should that control be selected. This correlation can be enhanced through text descriptions on the object or audio feedback that is triggered when the object/I.E is placed into its 'active by rollover' state.

The user's familiarity with the scene of the Frame of Reference enables an easy cognitive transfer of their understanding of the scene and the relations between the objects in that scene onto the interface. The user quickly learns that their visual comprehension of the physical layout and relationships match the organization and controls of the interface, resulting in quick comprehension of usage, reduced trial and error of controls to "see what they do", and more direct access to the information and/or attainment of objectives by the user. The physical aspects of the scene tend to be the easiest to recognize, but an immersive interface does not necessarily have to be a physical site. An example of an immersive interface without a real physical site could be a religious web site, where the immersive interface starts with a scene of heaven; Saint Peter at the pearly gates (representing how to get into the religion), a church with placard indicating services. In all instances of immersive interfaces, the user feels somewhat "immersed" into the scene of the Frame of Reference of the interface and the interface is controlled by objects which use a pseudo-physical metaphor.

The Frame of Reference is not necessarily limited to a single scene, but could be a series of scenes linked together based upon the actions of the user. For example, the initial frame of reference may be a scene of a maintenance bay. The user may select an I.E. that appears to be an aircraft in the bay, and the interface may transform into a new scene where the user has climbed into the cockpit of the aircraft and now views a scene of the control panel. The user has now encountered two distinctly different scenes; however, the Frame of Reference flows through the scenes and the user still understands where he is according to the initial Frame of Reference and how the scenes are linked.

The immersive interface promotes high levels of communication and understanding with the user. The immersive interface responds to every user action with an I.E. with appropriate feedback—visual imagery, visual text, and/or audio. Feedback should clarify controls, guide the user on correct or incorrect uses of the interface, engage the user through humor or creativity, and/or provide further information and insight into the organization of the software. This intent is captured in the User Action/Input Feedback Principles.

These User Action/Input Feedback Principles are to provide rapid and multiple types of feedback to the user, and within that the feedback the user should be relayed an understanding of the underlying controls of the interface. Although not required throughout the entire interface, particularly where traditional controls are implemented, the multiple types of feedback to user interaction with an I.E are in three forms; visual imagery feedback, visual textual feedback, and audio feedback. Examples of visual imagery feedback includes a glow, an outline, a darkening of the surrounding interface, movement of the object, minor and/or a transformation of the object, for example. (The feedback also informs the user of the approximate shape of the control). Visual imagery feedback could also be a video clip that appears, or an animation, or a series of pictures. Audio feedback can be a click, a beep, or the triggering of a voice that speaks. The visual textual feedback can be a pop-up text box, a pop-up flag with text, or as in the example immersive interface, a change in an existing text display object (see FIG. 17 "Corporate Overview I.E. Active by Another I.E.

Button Highlight and Screen Text Changes"). The immersive interface provides information regarding what the selection or utilization of that I.E. control will yield, and this can be achieved through any of the three feedback routes. For example, I.E.s could include a text screen box that pops up and describes what will happen if that control is selected, or an audio voice that explains all the topics that can be accessed by that control. Or the I.E. could trigger another I.E.s to become activated, causing it to achieve the objective of informing the user of the result should the I.E. control be utilized.

The next integral element of the interface is the Interactivity Elements (I.E.s). Interactivity elements may manifest themselves in the immersive interface in many ways; as pictures of objects; text; traditional Windows controls such as buttons; or rendered/virtual objects, to name a few. The significance of the Interactivity Element within the immersive interface rests upon the manner in which the interface responds to each user interaction with an I.E. (triggering an I.E. state) and how submenuing is performed.

In the preferred embodiment, the I.E.s of an immersive interface have an inactive state, an active by rollover state, and a single-left-click (select) state. These are typically presented as varying degrees of user interaction. Other states such as right click state, active by another I.E., double-left click state, and others are optional depending upon interface complexity.

The 'Inactive' State is where the I.E. is in its native state. An I.E. is typically in the inactive state when the user has not positioned the cursor (using the pointing device) on top of the I.E.

The "active by rollover" state occurs when the user places the cursor onto an I.E. This state provides visual imagery, visual text, and auditory feedback to the user in accordance with the User Action/Feedback Principles.

The 'single left click' State is achieved when the user positions the cursor on top of an I.E. and then clicks the left button on the pointing device (e.g., cursor or light pen). This act is recognized as a selection of the I.E., an indicator to the interface that the user has chosen to exercise the control. The 'single left click' state typically causes the immersive interface to immediately provide feedback that a control has been selected and then execute a task, whether it be to retrieve more data and display a typical control, initiate an immersive submenu, link to another site, etc. The feedback in this case may be an audio click or beep, a narrator requesting the user to 'please hold, we're servicing that request', or simply the triggering of an animation which shows the user physically moving, of or a transformation animation showing the immersive interface transitioning into a submenu, or any kind of multimedia data presentation response. The executed task can be any task required of a servicing computer on the network or the local computer.

Other states may be utilized depending upon the complexity of the interface. "Active by Another I.E." is when an I.E. is triggered by the users interaction with another I.E. "Single Right Click" state occurs when a user uses the right button of the pointing device while the cursor is placed over an I.E., while 'double left-click' state is achieved by the user quickly clicking the left button of the pointing device twice in succession while the cursor is placed over an I.E. Use of additional states are preferably explained to the user when the orientation brief is provided to the user upon opening a screen.

Submenuing is the appearance of new I.E.s based upon the selection of an I.E. There are three types; Closeup, Transformation, and traditional.

'Closeup' submenus are a zoom-in view of the triggering I.E. As the new, larger view fills the screen, new I.E. objects are represented in the detail of the original I.E. object. Newer details or refinements which apparently were not visible in the original view may or may not appear. Close-up menus are designed to follow the logic of the Frame of Reference so that the user is constantly aware of their positioning within the overall Frame of Reference. This assists the user to understand where in the organizational hierarchy of the site they are located. Typically a Closeup submenu will follow the User Action/Input Feedback principles of the interface.

'Transformation' submenus result when the frame of reference screen undergoes some type of display change based upon a user interacting with an I.E. One single I.E. may change, several I.Es may change, or the entire screen may shift. Transformation submenus, however, are changes within the context of the frame of reference. Transformation menus are also designed to follow the logic of the Frame of Reference so that the user is constantly aware of their positioning within the overall Frame of Reference. Transformation submenus typically will follow the User Action/Input Feedback principles of the interface.

Traditional submenus result from the user interacting with an I.E. as well. Traditional submenus contain the normal controls encountered such as buttons, hypertext, scrolling text boxes, etc., and are necessary to interact with other portions of the computer system. These controls mark the border of the immersive interface and are the links to the underlying computer, computer software, and operating system.

The Interface Orientation is another characteristic of the immersive interface according to the preferred embodiment. The Interface Orientation either is activated upon initial entry of the interface or upon request by the user through a control. The purpose of this brief is to provide to the user a multimedia overview of the organization and controls of the interface. Submenus typically also possess an Interface Orientation to advise the user of new I.E.s and their purpose. The Interface Orientation may be an audio orientation provided to the user, and/or a text box that is provided on a part of the screen that the user has just entered.

Traditional controls/input techniques are also utilized, as the immersive interface is an access method to a computer. The immersive interface may just lead to a scrolling text box with descriptions, or a normal database query field for searching the database. For example, if the user selects the "Team Overview" I.E. on the Corporate Overview Submenu shown in FIG. 24, then the sub-sub-menu that appears on the display (not shown) may just appear with traditional boxes and/or radio button and/or pull-down menu controls, for example. The immersive interface initially immerses the user into a physical scene, and after selecting different objects the interface will bring in and display information using traditional display techniques.

Component Functioning

There are various different ways to implement the immersive interface according to the present invention. In the preferred embodiment, the customer utilizes a personal computer running either a Netscape or Internet Explorer (the two predominant PC based browsers). The preferred embodiment utilizes a Macromedia Authorware Shockwave Plug-in that can be downloaded from various sources. Once the user downloads the plug-in, portions of program code are sent to the requesting server client, the immersive interface appears to the user.

The immersive interface according to the preferred embodiment was developed in several components utilizing off-the-shelf commercial software applications. Audio is recorded and developed using SoundForge. Video is developed using Adobe Premiere. 3D rendered scenes and virtual reality are developed using Adobe Photoshop, Caligari Truespace, and 3D Studio Max. Photo-realistic scenes are created using Adobe Photoshop. The components are programmed and packaged using Macromedia Authorware, and it is converted to internet streaming code using Macromedia Shockwave. Macromedia Authorware is an object-oriented, higher level derivative language of C++ which uses its own proprietary objects and methods for developing interactive multimedia. This tool also provides capability for a full usage of traditional interaction controls and displays such as buttons, scrolling text boxes, radio boxes, etc.

The interactive elements themselves are created in a variety of tools using several principles well known to practitioners of the art, including layering, true-color, alpha-channels for transparency, clipping, page-flipping, and other multimedia techniques. Rollovers are continuously checked by reading the x-axis and y-axis location of the pointer on screen and correlating that to the known coordinates of interactive elements. Clicking and the variety of other states for I.E.s are communicated to the program through the operating system. Moving, highlighting, and transformation effects are performed by creatively flipping images, reloading images, or running video clips and animations in various formats such as .flc, .mov, or .avi. Audio is primarily communicated using the .wav format. Compression and innovative, on demand file swapping is performed by Macromedia Shockwave. Certain graphics and other multimedia elements may be utilized that possess their own native compression algorithms, such as .jpg and .avi.

While the above components are described with respect to the preferred embodiment, other similar types of components may be utilized, while remaining within the scope of the invention.

The present implementation of the immersive interface takes a little over three minutes to download using a T-1 (approximately 1 megabit per second) connection to the Internet. The more heavily complex the interface with graphic, video, or audio typically requires even longer download times. Trial and error usage of the immersive interface on current narrowband networks can be extremely time consuming, underscoring the need for robust interaction and clear communication of site organization.

While a preferred embodiment has been described herein, modification of the described embodiment will become apparent to those of ordinary skill in the art, following the teachings of the invention, without departing from the spirit and scope of the invention as set forth in the appended claims. For example, while the drawings are shown in black-and-white images, one of ordinary skill in the art will understand that these images are typically color images. Also, as an option, when going from a sub-menu to a next-higher-level menu, an intermediate screen appears, which mimics a user moving from a frame of reference location corresponding to the sub-menu (e.g., conference room of FIG. 24) back to the frame of reference location corresponding to the next-higher-level menu (e.g., receptionist area of FIG. 1A).

As explained in the Background section, the inability to isolate user types (e.g., mechanic, engineer, internal employee, customer) due to universal access makes conventional multimedia interfaces less desirable. However, the immersive interface of the present invention is configured so that it can be tailored to a type of user. For example, if most of the users are mechanics, then the immersive interface can be tailored so that it is heavily mechanical (e.g., drawer images, tool images), and thus a mechanic would readily recognize the differences between the various interactivity elements.

Also, while the preferred embodiment of the invention has been described with reference to navigating through web pages on the Internet/World Wide Web, the invention is also applicable to accessing information on other networks, such as a company's Intranet having information stored at a server computer that can be accessed by others (client computers) through at least one graphical display (page).

What is claimed is:

1. A method for providing an interface to a user for navigating a web page, comprising:

a) displaying the web page to the user, the web page including a plurality of separate interactive elements positioned at different locations on the web page; and b) as the user moves a pointer device to various positions on the web page, providing feedback to the user that informs the user as to information related to one of the plurality of separate interactive elements that the user is currently positioning the pointer device on, wherein the feedback is at least two of text feedback, visual imagery feedback, and audio feedback, wherein each of the plurality of separate interactive elements respectively correspond to a visual image of a particular physical element, wherein the plurality of separate interactive elements provides a visual image of a location and physical elements located therein, for the user to intuitively navigate the web page based in part on the user being physically immersed in a physical environment corresponding to the location shown on the web page, and wherein the user navigates through the web page based on intuitive understanding of what each of the plurality of separate interactive elements represents.

2. The method according to claim 1, wherein the visual imagery feedback comprises changing a visual characteristic of another of the plurality of separate interactive elements that is related to the one of the plurality of separate interactive elements, and that is not currently being pointed to by the pointer device.

3. The method according to claim 2, wherein each of the plurality of separate interactive elements is capable of being in one of an inactive state, a roll-over state, an active state, and an active-by-another-element state, and wherein the one of the plurality of separate interactive elements transitions from the inactive state to the roll-over state when the pointer device is currently positioned on the one of the plurality of separate interactive elements, and at the same time the another of the plurality of separate visual elements transitions from the inactive state to the active-by-another-element state.

4. The method according to claim 3, wherein the one of the plurality of separate interactive elements transitions to the active state from a current state that does not correspond to the active state when the pointer device is activated when currently positioned on the one of the plurality of separate interactive elements.

5. The computer program product according to claim 3, wherein the pointer device is a mouse having at least one clicker, and wherein the pointer device is activated when the clicker is clicked.

6. The method according to claim 1, further comprising:

c) when the user selects the one of the plurality of separate interactive elements by performing a particular operation with the pointer device, providing a transitional display which provides a visual transition from the web page to another page that corresponds to information related to the one of the plurality of separate interactive elements, wherein the web page corresponds to a pictorial image of a first particular location, wherein the another page corresponds to a pictorial image of a second particular location, and wherein the visual transition corresponds to a sequence of pictorial images of what the user would see if the user moved from the first particular location to the second particular location.

7. The method according to claim 1, wherein each of the plurality of separate interactive elements respectively correspond to a particular physical element, and wherein the user navigates through the web page based on intuitive understanding of what each of the plurality of separate interactive elements represents.

8. The method according to claim 1, wherein at least one of the plurality of separate interactive elements corresponds to a visual image of a book disposed on a table, and wherein the user selecting the interactive image corresponding to the book operates to move to a separate web page that contains information as to a company's portfolio.

9. The method according to claim 1, wherein at least one of the plurality of separate interactive elements corresponds to a door with a sign indicating that the door leads to a laboratory room of a company, and wherein the user selecting the interactive element corresponding to the door operates to move to another web page that includes a visual image of the laboratory room, and that allows the user to select information concerning products made by the company.

10. The method according to claim 1, wherein the one of the plurality of separate interactive elements corresponds to a visual image of a button with words disposed within the button so as to describe contents provided in a second web page that will be displayed to the user when the one of the plurality of separate interactive elements is activated, and wherein the another of the plurality of separate interactive elements corresponds to a visual image of an intuitive object that is intuitively related to the contents provided in the second web page.

11. The method according to claim 10, wherein the button is disposed on a first portion of the web page along with other buttons that are disposed at different positions in the first portion, and wherein the visual image of the intuitive object is disposed on a second portion of the web page along with other visual images of different intuitive objects that are disposed at different positions in the second portion.

12. The method according to claim 1, wherein the web page provides a visual image of a reception area of a company, wherein the visual image includes visual images of a plurality of reception area exit paths leading to other areas of the company that are capable of being displayed as separate web pages to the user, and wherein one of the separate web pages is displayed to the user in place of the web page of the reception area upon activation by the user of one of the separate interactive elements that corresponds to a visual image of a corresponding one of the plurality of reception area exit paths.

13. A method for providing an interface to a user for navigating a web site that includes a plurality of web pages having a particular hierarchical structure, comprising:

a) displaying an initial web page to the user that corresponds to a home web page, the initial web page including a plurality of separate interactive elements positioned at different locations on the initial web page to provide a frame of reference to the user; and b) as the user moves a pointer device to various positions on the web page, changing characteristics of the initial web page such that when the pointer device is currently located at a position on the initial web page corresponding to one of the plurality of separate interactive elements, a visual characteristic of the one of the plurality of separate elements changes and the visual characteristic of another of the plurality of separate interactive elements changes, wherein the another of the plurality of separate interactive elements is logically related to the one of the plurality of separate interactive elements, wherein each of the plurality of separate interactive elements respectively correspond to a visual image of a particular physical element, wherein the plurality of separate interactive elements provides a visual image of a location and physical elements located therein, for the user to intuitively navigate the initial web page based in part on the user being physically immersed in a physical environment corresponding to the location shown on the initial web page, and wherein the user navigates through the initial web page based on intuitive understanding of what each of the plurality of separate interactive elements represents.

14. The method according to claim 13, further comprising:

c) after step a) but before step b), providing orientation information to the user with regards to the initial page, the orientation information comprising at least one of text information, audio information and visual imagery.

15. The method according to claim 13, wherein the user is provided with feedback when the pointer device is currently located at the position on the initial page corresponding to the one of the plurality of separate interactive elements, the feedback including at least two of text feedback, visual imagery feedback, and audio feedback.

16. The method according to claim 15, wherein one of the plurality of separate interactive elements corresponds to a visual image of a person, and wherein the visual imagery feedback comprises changing a visual characteristic of the visual image of the person to mimic the person speaking, while at the same time providing the audio feedback to the user.

17. The method according to claim 13, further comprising:

c) when the user selects the one of the plurality of separate interactive elements by performing a particular operation with the pointer device, providing a transitional display which provides a visual transition from the initial page to a second page that corresponds to information related to the one of the plurality of separate interactive elements, wherein the initial page corresponds to a pictorial image of a first particular location, wherein the second page corresponds to a pictorial image of a second particular location, and wherein the visual transition corresponds to a sequence of pictorial images of what the user would see if the user moved from the first particular location to the second particular location.

18. A method for browsing a web page, comprising:

a) displaying the web page to the user, the web page including a plurality of separate interactive elements positioned at different locations on the web page; and b) as the user moves a pointer device to various positions on the web page, providing feedback to the user that informs the user as to information related to one of the plurality of separate interactive elements that the user is currently positioning the pointer device on, wherein the feedback is at least two of text feedback, visual imagery feedback, and audio feedback, wherein each of the plurality of separate interactive elements respectively correspond to a particular physical element, wherein each of the plurality of separate interactive elements respectively correspond to a visual image of a particular physical element, wherein the plurality of separate interactive elements provides a visual image of a location and physical elements located therein, for the user to intuitively navigate the web page based in part on the user being physically immersed in a physical environment corresponding to the location shown on the web page, and wherein the user navigates through the web page based on intuitive understanding of what each of the plurality of separate interactive elements represents.

19. The method according to claim 18, wherein visual imagery feedback comprises changing a visual characteristic of another of the plurality of separate interactive elements that is related to the one of the plurality of separate interactive elements, and that is not currently being pointed to by the pointer device.

20. The method according to claim 19, wherein each of the plurality of separate interactive elements is capable of being in one of an inactive state, a roll-over state, an active state, and an active-by-another-element state, and wherein the one of plurality of separate interactive elements transitions from the inactive state to the roll-over state when the pointer device is currently positioned on the one of the plurality of separate interactive elements, and at the same time the another of the plurality of separate interactive elements transitions from the inactive state to the active-by-another-element state.

21. The method according to claim 20, wherein the one of the plurality of separate interactive elements transitions to the active state from a current state that does not correspond to the active state when the pointer device is activated when currently positioned on the one of the plurality of separate interactive elements.

22. The method according to claim 21, wherein the pointer device is a mouse having at least one clicker, and wherein the pointer device is activated when the clicker is clicked.

23. The method according to claim 18, wherein one of the plurality of separate interactive elements corresponds to a visual image of a person, and wherein the visual imagery feedback comprises changing a visual characteristic of the visual image of the person to mimic the person speaking, while at the same time providing the audio feedback to the user.

24. The method according to claim 18, further comprising:

c) when the user selects the one of the plurality of separate interactive elements by performing a particular operation with the pointer device, providing a transitional display which provides a visual transition from the web page to another page that corresponds to information related to the one of the plurality of separate interactive elements, wherein the web page corresponds to a pictorial image of a first particular location, wherein the another page corresponds to a pictorial image of a second particular location, and wherein the visual transition corresponds to a sequence of pictorial images of what the user would see if the user moved from the first particular location to the second particular location.

25. The method according to claim 18, further comprising:

c) after step a) but before step b), providing orientation information to the user with regards to the page, the orientation information comprising at least one of text information, audio information and visual imagery.

26. The method according to claim 25, further comprising:

c) after step a) but before step b), providing first orientation information to the user with regards to the page, the first orientation information comprising at least one of text information, audio information and visual imagery; and d) after step c) but before any operation performed by the user on the sub-page, providing second orientation information to the user with regards to the sub-web page, the second orientation information comprising at least one of text information, audio information and visual imagery.

27. The method according to claim 26, wherein the first and second orientation information respectively inform the user as to various operations that can be made via the pointer device on the page and the sub-page, as well as information that can be obtained based on the various operations.

28. The method according to claim 26, wherein at least one of the first and second orientation information is provided as both audibly and textually to the user.

29. The method according to claim 18, wherein the visual imagery feedback comprises a sequence of different static images that sequentially change a visual characteristic of the one of the plurality of separate interactive elements.

30. The method according to claim 18, wherein each of the plurality of separate interactive elements respectively correspond to a particular physical element, and wherein the user navigates through the page based on intuitive understanding of what each of the plurality of separate interactive elements represents.

31. A computer program product that provides an interface to a user for navigating a web page, comprising:

first program product code that displays the web page to the user, the web page including a plurality of separate interactive elements positioned at different locations on the web page; and second program product code that, as the user moves a pointer device to various positions on the web page, provides feedback to the user that informs the user as to information related to one of the plurality of separate interactive elements that the user is currently positioning the pointer device on, wherein the feedback is at least two of text feedback, visual imagery feedback, and audio feedback, wherein each of the plurality of separate interactive elements respectively correspond to a visual image of a particular physical element, wherein the plurality of separate interactive elements provides a visual image of a location and physical elements located therein, for the user to intuitively navigate the web page based in part on the user being physically immersed in a physical environment corresponding to the location shown on the web page, and wherein the user navigates through the web page based on intuitive understanding of what each of the plurality of separate interactive elements represents.

32. The computer program product according to claim 31, wherein visual imagery feedback comprises changing a visual characteristic of another of the plurality of separate interactive elements that is related to the one of the plurality of separate interactive elements, and that is not currently being pointed to by the pointer device.

33. The computer program product according to claim 32, wherein each of the plurality of separate interactive elements is capable of being in one of an inactive state, a roll-over state, an active state, and an active-by-another-element state, and wherein the one of plurality of separate interactive elements transitions from the inactive state to the roll-over state when the pointer device is currently positioned on the one of the plurality of separate interactive elements, and at the same time the another of the plurality of separate interactive elements transitions from the inactive state to the active-by-another-element state.

34. The computer program product according to claim 33, wherein the one of the plurality of separate interactive elements transitions to the active state from a current state that does not correspond to the active state when the pointer device is activated when currently positioned on the one of the plurality of separate interactive elements.

35. The computer program product according to claim 31, wherein one of the plurality of separate interactive elements corresponds to a visual image of a person, and wherein the visual imagery feedback comprises changing a visual characteristic of the visual image of the person to mimic the person speaking, while at the same time providing the audio feedback to the user.

36. The computer program product according to claim 31, further comprising:

third program product code that, when the user selects the one of the plurality of separate interactive elements by performing a particular operation with the pointer device, provides a transitional display which provides a visual transition from the web page to another page that corresponds to information related to the one of the plurality of separate interactive elements, wherein the web page corresponds to a pictorial image of a first particular location, wherein the another page corresponds to a pictorial image of a second particular location, and wherein the visual transition corresponds to a sequence of pictorial images of what the user would see if the user moved from the first particular location to the second particular location.

37. The computer program product according to claim 31, further comprising:

third program code that provides orientation information to the user with regards to the web page as soon as the web page appears on a display to the user, the orientation information comprising at least one of text information, audio information and visual imagery.

38. The computer program product according to claim 37, wherein the orientation information informs the user as to various operations that can be made via the pointer device on the web page, and information that can be obtained based on the various operations.

39. The computer program product according to claim 31, wherein the visual imagery feedback comprises a sequence of different static images that sequentially change a visual characteristic of the one of the plurality of separate interactive elements.

40. The computer program product according to claim 31, wherein each of the plurality of separate interactive elements respectively correspond to a particular physical element, and wherein the user navigates through the web page based on intuitive understanding of what each of the plurality of separate interactive elements represents.

41. A computer program product that provides an interface to a user for navigating a web site that includes a plurality of web pages having a particular hierarchical structure, comprising:

first program product code that displays an initial web page to the user that corresponds to a home web page, the initial web page including a plurality of separate interactive elements positioned at different locations on the initial web page to provide a frame of reference to the user; and second program product code that, as the user moves a pointer device to various positions on the web page, changes characteristics of the initial web page such that when the pointer device is currently located at a position on the initial web page corresponding to one of the plurality of separate interactive elements, a visual characteristic of the one of the plurality of separate elements changes and the visual characteristic of another of the plurality of separate interactive elements changes, wherein the another of the plurality of separate interactive elements is logically related to the one of the plurality of separate interactive elements, wherein each of the plurality of separate interactive elements respectively correspond to a particular physical element, wherein each of the plurality of separate interactive elements respectively correspond to a visual image of a particular physical element, wherein the plurality of separate interactive elements provides a visual image of a location and physical elements located therein, for the user to intuitively navigate the initial web page based in part on the user being physically immersed in a physical environment corresponding to the location shown on the initial web page, and wherein the user navigates through the initial web page based on intuitive understanding of what each of the plurality of separate interactive elements represents.

42. The computer program product according to claim 41, further comprising:

third program code that provides orientation information to the user with regards to the initial web page, the orientation information comprising at least one of text information, audio information and visual imagery.

43. The computer program product according to claim 42, wherein the user is provided with feedback when the pointer device is currently located at the position on the initial web page corresponding to the one of the plurality of separate interactive elements, the feedback including at least two of text feedback, visual imagery feedback, and audio feedback.

44. The computer program product according to claim 43, wherein one of the plurality of separate interactive elements corresponds to a visual image of a person, and wherein the visual imagery feedback comprises changing a visual characteristic of the visual image of the person to mimic the person speaking, while at the same time providing the audio feedback to the user.

45. The computer program product according to claim 43, further comprising:

third program product code that, when the user selects the one of the plurality of separate interactive elements by performing a particular operation with the pointer device, provides a transitional display which provides a visual transition from the initial web page to another page that corresponds to information related to the one of the plurality of separate interactive elements, wherein the initial web page corresponds to a pictorial image of a first particular location, wherein the another page corresponds to a pictorial image of a second particular location, and wherein the visual transition corresponds to a sequence of pictorial images of what the user would see if the user moved from the first particular location to the second particular location.

46. A computer program product for use in browsing a web page, comprising:

first program product code for displaying the web page to the user, the web page including a plurality of separate interactive elements positioned at different locations on the web page; and second program product code that, as the user moves a pointer device to various positions on the web page, provides feedback to the user that informs the user as to information related to one of the plurality of separate interactive elements that the user is currently positioning the pointer device on, wherein the feedback is at least two of text feedback, visual imagery feedback, and audio feedback, wherein each of the plurality of separate interactive elements respectively correspond to a particular physical element, wherein each of the plurality of separate interactive elements respectively correspond to a visual image of a particular physical element, wherein the plurality of separate interactive elements provides a visual image of a location and physical elements located therein, for the user to intuitively navigate the web page based in part on the user being physically immersed in a physical environment corresponding to the location shown on the web page, and wherein the user navigates through the web page based on intuitive understanding of what each of the plurality of separate interactive elements represents.

47. The computer program product according to claim 46, wherein visual imagery feedback comprises changing a visual characteristic of another of the plurality of separate interactive elements that is related to the one of the plurality of separate interactive elements, and that is not currently being pointed to by the pointer device.

48. The computer program product according to claim 47, wherein each of the plurality of separate interactive elements is capable of being in one of an inactive state, a roll-over state, an active state, and an active-by-another-element state, and wherein the one of plurality of separate interactive elements transitions from the inactive state to the roll-over state when the pointer device is currently positioned on the one of the plurality of separate interactive elements, and at the same time the another of the plurality of separate interactive elements transitions from the inactive state to the active-by-another-element state.

49. The computer program product according to claim 48, wherein the one of the plurality of separate interactive elements transitions to the active state from a current state that does not correspond to the active state when the pointer device is activated when currently positioned on the one of the plurality of separate interactive elements.

50. The computer program product according to claim 49, wherein the pointer device is a mouse having at least one clicker, and wherein the pointer device is activated when the clicker is clicked.

* * * * *